(12) United States Patent
Jacoway et al.

(10) Patent No.: US 11,639,756 B1
(45) Date of Patent: May 2, 2023

(54) UNITARY STUB OUT AND ROUGH-IN PLUMBING VALVE CYLINDER INCLUDING A REAR MOUNTING PLATE WITH AN INTEGRAL CONDUIT MEMBER EXTENDING THERE FROM WITH SUPPORT AND LEVELING FLANGE MEMBERS IN COOPERATION THEREWITH

(71) Applicants: Michael G. Jacoway, Greer, SC (US); M. Grayson Jacoway, Simpsonville, SC (US)

(72) Inventors: Michael G. Jacoway, Greer, SC (US); M. Grayson Jacoway, Simpsonville, SC (US)

( * ) Notice: Subject to any disclaimer, the term of this patent is extended or adjusted under 35 U.S.C. 154(b) by 0 days.

(21) Appl. No.: 17/858,795

(22) Filed: Jul. 6, 2022

(51) Int. Cl.
| F16K 27/06 | (2006.01) |
| E03C 1/02 | (2006.01) |
| F16K 27/12 | (2006.01) |

(52) U.S. Cl.
CPC ............ *F16K 27/065* (2013.01); *E03C 1/021* (2013.01); *F16K 27/12* (2013.01); *E03C 2001/026* (2013.01)

(58) Field of Classification Search
CPC ......... F16K 27/065; F16K 27/12; E03C 1/021
See application file for complete search history.

(56) References Cited

U.S. PATENT DOCUMENTS

| 3,096,782 A | 7/1963 | Williams |
| 3,761,967 A | 10/1973 | Owings |
| 3,847,175 A | 11/1974 | Anderson |
| 4,637,422 A | 1/1987 | Izzi, Sr. |
| 4,654,900 A | 4/1987 | McGhee |
| 5,330,137 A | 7/1994 | Olivia |
| 5,598,670 A | 2/1997 | Humphrey et al. |
| 5,653,254 A | 8/1997 | Condon et al. |
| 5,803,508 A | 9/1998 | Lowella |
| 6,234,193 B1 | 5/2001 | Hobbs et al. |
| 6,378,910 B1 | 4/2002 | Malman |
| 6,378,912 B1 * | 4/2002 | Condon ............... F16L 5/06 4/596 |
| 6,435,206 B1 | 8/2002 | Minnick |
| 6,666,419 B1 | 12/2003 | Vrame |
| 6,845,785 B1 | 1/2005 | Condon |
| 7,077,156 B1 | 7/2006 | Humber et al. |
| 7,360,553 B1 | 4/2008 | Ismert |

(Continued)

*Primary Examiner* — Kevin R Barss
(74) *Attorney, Agent, or Firm* — George L. Walton; Parts LLC

(57) ABSTRACT

A molded one-piece stub out and rough-in plumbing valve cylinder including a front cylindrical face having a front inner off-set cavity disposed therein, which extends to an inner wall member forming an integral conduit member that extends into an inner cylindrical rear cavity extending from an inner cylindrical rear wall surface on an opposite side of the front cylindrical face to an open ended mounting plate. The integral conduit member extends through the inner cylindrical rear cavity to a selective distance beyond the open end of the mounting plate. A plurality of support members disposed on the integral conduit member along a portion thereon and along portion of the inner cylindrical rear cavity for supporting the integral conduit member therein. Also, the integral conduit member includes a self-leveling member to level the mounting plate upon attachment to vertical or horizontal wall framed stud members.

20 Claims, 21 Drawing Sheets

(56) References Cited

U.S. PATENT DOCUMENTS

| | | | |
|---|---|---|---|
| 8,789,555 B2 | 7/2014 | Ball et al. | |
| 9,057,460 B2 | 6/2015 | Ismert et al. | |
| 9,725,892 B2 | 8/2017 | Ismert et al. | |
| 9,963,858 B2 | 5/2018 | Bors et al. | |
| 10,683,645 B2 | 6/2020 | Brown | |
| 2006/0027776 A1* | 2/2006 | Pierson | F16L 37/40 251/149.6 |
| 2010/0032944 A1* | 2/2010 | Anderson | E03C 1/021 285/189 |
| 2012/0273064 A1* | 11/2012 | Ismert | F16L 5/14 137/360 |
| 2013/0082201 A1* | 4/2013 | Condon | E03C 1/021 251/213 |
| 2015/0259891 A1* | 9/2015 | Ismert | E03C 1/12 137/360 |
| 2019/0376622 A1* | 12/2019 | Thuston | F16L 3/08 |
| 2022/0349159 A1* | 11/2022 | Cosley | E03C 1/021 |

\* cited by examiner

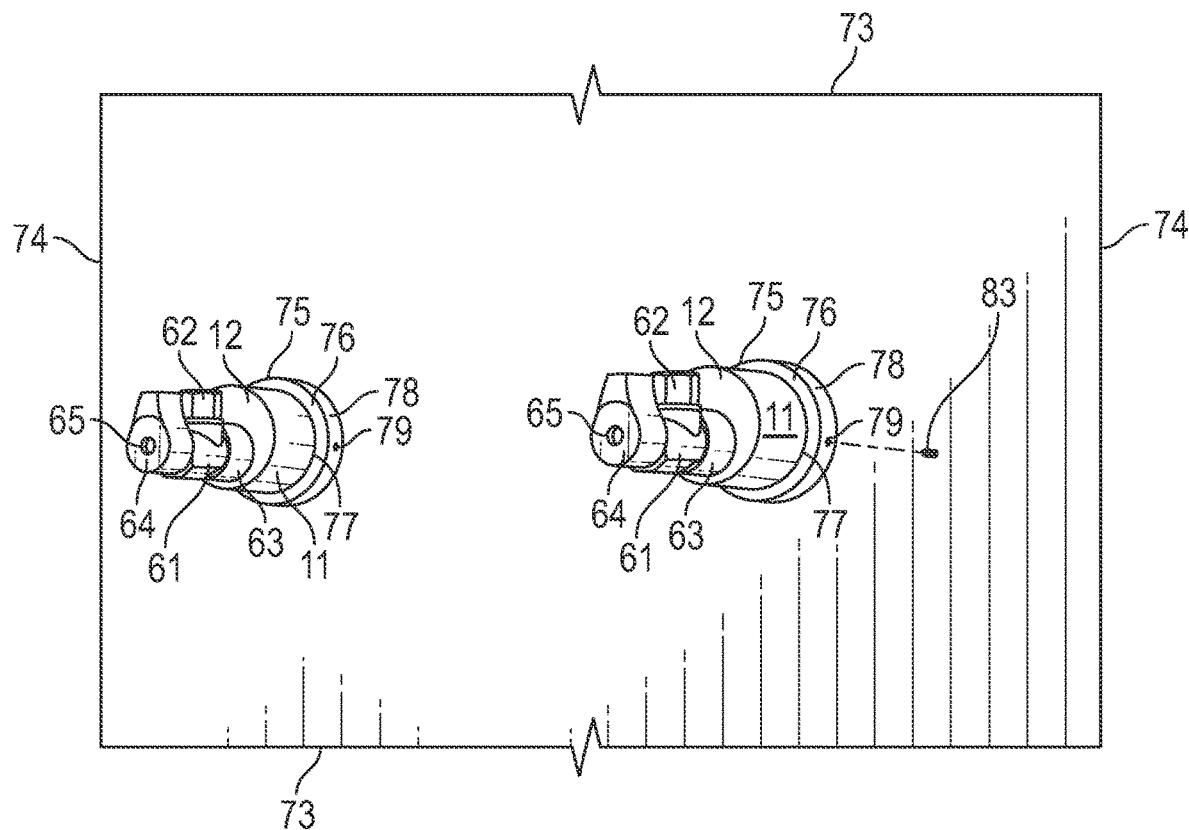
FIG. 25
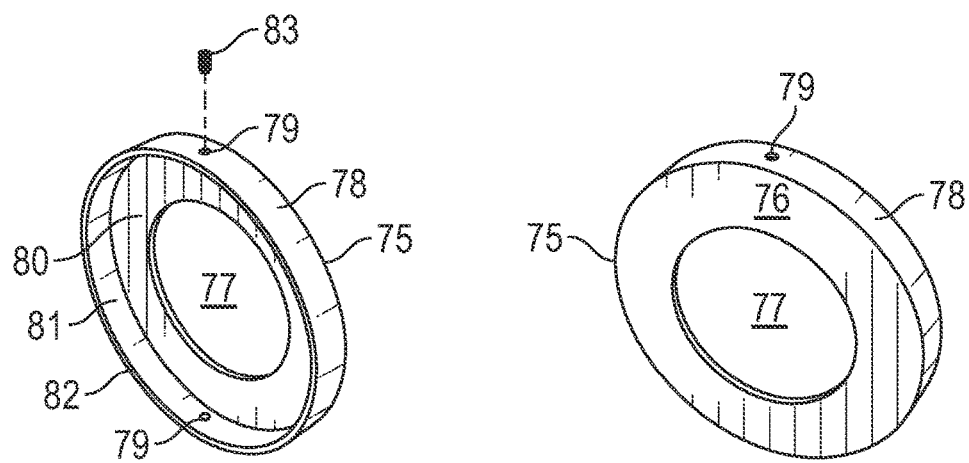
FIG. 26
FIG. 27

UNITARY STUB OUT AND ROUGH-IN PLUMBING VALVE CYLINDER INCLUDING A REAR MOUNTING PLATE WITH AN INTEGRAL CONDUIT MEMBER EXTENDING THERE FROM WITH SUPPORT AND LEVELING FLANGE MEMBERS IN COOPERATION THEREWITH

BACKGROUND OF THE INVENTION

1. Field of the Invention

The present invention relates generally to a new and useful improvement of a unitary stub out and rough-in plumbing valve cylinder assembly designed for plumbing fixtures and water stop valves that includes an off-set front cavity with an off-set conduit opening, an integral rear conduit member that extends from a rear cavity within the valve cylinder and there through to a selective distance beyond an open end of an integral stub out mounting plate. The integral rear conduit is supported and connected by a plurality of support members within and along the rear cavity, and at the open end of the integral stub mounting plate to provide rigid support for water supply tubing that is received within the off-set conduit and the rear conduit member against movement, vibration, flexing and bending therein. Further, the integral rear conduit member includes a leveling member along a portion thereof to level the unitary stub out and rough-in plumbing valve cylinder assembly for enabling plumbers to easily level and directly mount the unitary stub out and rough-in plumbing valve cylinder assembly directly to wall framed studs during a rough-in phase plumbing of a residential or commercial building without ever having to use mounting straps, strips, bars or plates.

This new and improved unitary stub out and rough-in plumbing valve cylinder assembly is designed to save plumbers precious time and cost in the installation of diverse types of plumbing fixtures and water stop valves that are associated with sinks, toilets, dish washers, clothes washers, humidifiers, ice makers, hot water heaters, cabinets, vanities, and other water fixture devices.

2. Description of the Related Art

It is well known that conventional prior art water stop valves are not normally installed to water supply lines or conduits in building constructions, such as housing and commercial building structures, during what is called the "rough-in phase", however, they are conventionally installed during what is called the "trim out phase". Note that these water supply lines or conduits are normally attached by a mounting plate assembly to vertical and/or horizontal wall framed stud members of the housing and commercial building structures.

When new building construction, such as houses and commercial building structures, the building structures are framed, the water supply pipe lines are installed, the roof and shingles are installed and the windows and doors are installed, which constitutes the "rough-in phase". Next, the "trim out phase" occurs when the drywalls, plaster walls, stucco walls are installed and the utilities have been roughed in, waiting for vanities, cabinets, electrical fixtures, and plumbing fixtures, such as water stop valve devices to be installed so the painters can finish their work.

Normally, during this "rough-in phase", the plumber is called to come in to install all the drains for the toilets, vanities and sinks for bathrooms and kitchens and run ¾" copper and/or plastic type water pipe lines or conduits (discussed in greater details later) from a pressure reducing valve and hot water heaters to the bathrooms, kitchens, and utility rooms or other areas. These copper and/or plastic type water lines or conduits run within the walls, basement and crawl spaces with half-inch copper "T" fittings or "L" fittings (the half-inch pipe and a main three quarter-inch water line forms a "T" fitting shaped assembly or a 90 degree copper "L" fitting shaped assembly) every place where toilets, sinks, ice makers, washing machines, and all other water fixtures requiring water will be placed. Then the plumber will stub out the half-inch copper and/or plastic type water pipe lines or conduits about 6 to 8 inches from the stub out framed wall at every "T" fitting or 90 degree "L" fitting. There will be one for every toilet and two for every sink to accommodate hot and cold water fixtures.

Once the rough-in phase has been completed, plumbers are now ready to test for water leaks at each location on the copper water pipe lines or conduits where the "T" and "L" shaped fittings have been soldered throughout the entire building structure, and on the plastic type water pipe lines or conduits connected to "T" and "L" shaped fittings throughout the entire building structure by turning on the water to the building structures at the water meter or at the main water cut-off valve. After this testing for water leaks have been completed and no water leaks were detected, plumbers will have to wait before returning to a building structure to complete their work. Their return will not happen until after the drywalls, and plaster or stucco walls have been hung, and bathroom vanities, kitchen sinks and kitchen cabinets have been installed. Once plumbers have been called back during the "trim out phase" to finish their job, then the plumbers are ready to shut-off the water at the main water cut-off valve for the entire building structure so that all water pipe lines or conduits can be drained for setting the toilets, bathtubs and shower stalls, installing water stop valves, faucets, tub and shower fixtures, and exterior water faucets or hydrants. Now, the plumbers will go to each location of a "T" shaped fitting and/or "L" shaped fitting where there is a half-inch copper or plastic type water pipe line or conduit that is stubbed out of the drywall, and plaster or stucco wall and attach a main supply line or conduit.

Now that the plumber's job during the "rough-in phase" has been completed, drywall, plaster or stucco wall, plywood wall, vanity, and cabinet installers will have to cut a large holes therein to accommodate and slide over water stop valves and copper and/or plastic type stub out water lines. After cutting the large holes they tend to leave large gaps around the stub out copper and/or plastic water lines and water stop valve connections that are connected to stub out copper water lines. These large gaps will allow pest such as mosquitoes, ants, bugs, beetles, ticks, fleas, spiders, bedbugs, cockroaches, flies, termites, and rodents, such as mice, and rats to get through the large gaps. Also, unwanted cold air and hot air can get through the large gaps during winter and summer months. In addition, there is a possibility that weeds can grow through the large gaps as well.

Now the time consuming and tedious job begins for plumbers during the "trim-out phase". If a "T" shaped fitting or "L" shaped fitting is located within a vanity, then a plumber will have to get on their back and slide into the vanity, which is a very tight space that does not give the plumber an easy work area to cut off a 6 to 8 inch copper and/or plastic type stub out water line or conduit. Then the plumber has to make sure the cut-off stub out water line or conduit is completely dry in order to solder or weld a water stop valve on hot and cold water copper lines for each vanity, kitchen sink, and bathroom sink or basin, which also includes a pedestal type sink and basin. Next, the plumber will cut off the 6 to 8 inch copper stub line for each toilet, while making sure that each cut-off copper stub line is completely dry so that the plumber can solder or weld a water stop valve to the copper stub out line or conduit for each toilet. Once this has been completed, the plumber will install water supply lines or conduits to the fixtures. Note that most of this work by the plumber has been performed in cramped areas within a vanity or cabinet, which is very inconvenient, burdensome, and time consuming. After all fixtures are in place, now the plumber can cut the water back on for an entire building structure so the copper pipe lines can be checked for water leaks. If no water leaks were detected, the plumber has finally completed the job, but a lot of excess time was spent in order to complete the job.

There are many different types of well-known prior art water stop or under fixture valves that are utilized during a "rough-in phase" and "trim out phase" of building constructions, both new and remodeling. One of the types of water stop or under fixture valves are described in U.S. Pat. Nos. 3,760,836 A and 3,985,152 A. Another type of water stop valve device is described as being connected to a stub out water line with a mounting dish and plate for securing the water stop valve device to stub out vertical wall studs by strap members as shown in U.S. Pat. Nos. 5,469,882 A, 5,577,530 A, and 5,755,247 A. Further, these patents describes a detachable cover that is provided for frictionally engaging an internal wall of the mounting dish for enclosing and protecting the valve during installation and finishing of the surrounding drywall. Also, a detachable ring-shaped escutcheon slides into the mounting dish once the cover has been removed. A further type of water stop valve is described as an inline shut-off valve assembly that is connected to a "T" fitting of a main water line as shown in U.S. Pat. No. 6,913,245 B2.

It is believed that U.S. Pat. No. 8,616,229 B2 is the closet prior art to the present invention. This patent clearly teaches a water stop valve device with a rough-in valve sleeve that allows a drywall, plywood wall, and plaster or stucco wall to slide over the water stop valve device, that will allow a plumber to attach water stop valves to all "T" fittings or "L" fittings and stub out water lines and completing their entire job during the "rough-in phase" and never have to come back to finish the job during the "trim out phase" as in conventional prior art.

It is well known in the plumbing industry that many of the water lines or conduits are made from copper, preferably having a dimension of ½" to ¾". Furthermore, to one of ordinary skill in the art, the water pipe lines or conduits can also be selected from any one of the groups consisting of cross-linked polyethylene (PEX), polyvinyl chloride (PVC), chlorinated polyvinyl chloride (CPVC), aluminum plastic composite (APC) or corrugated stainless steel tubing (CSST). Note that the above recited water pipe lines or conduits that are selected from either one or any combination of these various types of materials can provide many benefits relating to the environment, various applications of use, flexibility, temperature, and cost and labor savings to name just a few.

Note that the above recited prior art water stop or under fixture valve devices might have been creative and well-thought inventions that function well for their purposes at the time of their creation, but none of them taken singular or in combination with one another fails to teach the present invention having a molded one-piece or unitary stub out and rough-in plumbing valve cylinder including a front cylindrical face having an inner off-set cavity of a certain depth disposed therein, which extends to an inner wall member that forms an integral conduit member that extends therefrom, an integral rear cavity extending from an inner rear wall surface on an opposite side of the front cylindrical face to an open ended integral stub out mounting plate, the integral conduit member extends through the integral rear cavity to a selective distance beyond the open end of the integral stub out mounting plate, and the integral conduit member having a plurality of support members disposed within the rear cavity for rigidly supporting stub out water lines against movement and flexing therein and a plurality of flange members disposed thereon for self-leveling the one-piece or unitary stub out and rough-in plumbing valve cylinder when the integral stub out mounting plate is attached directly to vertical or horizontal wall framed stud members. Note that the above described features of the present invention will be discussed later in greater details in the "Summary of the Invention", recited below.

SUMMARY OF THE INVENTION

It is an object of the present invention to provide a molded one-piece or unitary stub out and rough-in plumbing valve cylinder including a front cylindrical face having a front inner off-set cavity of a certain depth disposed therein, which extends to an inner wall member forming an integral conduit member that extends therefrom and into an integral inner cylindrical rear cavity extending from an inner cylindrical rear wall surface on an opposite side of the front cylindrical face along an inner cylindrical rear side wall disposed on opposite sides of the inner cylindrical rear wall surface to an open ended integral stub out mounting plate. The integral conduit member extends through the integral inner cylindrical rear cavity to a selective distance beyond the open end of the integral stub out mounting plate member. Further, the integral conduit member having a plurality of support members disposed within and along the inner cylindrical rear cavity for rigidly supporting stub out water lines against movement and flexing therein, and a plurality of flange members disposed thereon for self-leveling the one-piece or unitary stub out and rough-in plumbing valve cylinder when the mounting plate is attached directly to vertical or horizontal wall framed stud members.

Another object of the present invention provides various types of water stop valves, such as, quarter-turn water stop valves can be utilized with the molded one-piece or unitary stub out and rough-in plumbing valve cylinder. The water stop valves or quarter turn valves include a valve body having one end receiving a valve stem there through and having a actuating valve handle attached thereto, a valve member disposed in the valve body and being attached to the other end of the valve stem, the other end of the valve body having a compression water inlet with a base end portion, a compression sealing member disposed within the compression inlet of the base end portion that is sealingly connected to an outlet portion of a stub out water pipe line or conduit with the base end portion abutting against the front cylindrical face and disposed about the front inner off-set cavity of the molded one-piece or unitary stub out and rough-in plumbing valve cylinder. Further, the water stop valve includes a water outlet disposed between the valve body one end and the compression water inlet that is sealingly connected to one end of a water supply line or conduit, and the other end thereof is sealingly connected to a water fixture device. In another type of water stop valve member, the difference is that the other end of the valve body includes a compression water inlet with a base end portion having a connector member that is sealingly connected to one end of a water supply line or conduit by a compression nut. The compression nut abuts against the front cylindrical face and disposed externally about the front inner off-set cavity of the molded one-piece or unitary stub out and rough-in plumbing valve cylinder. This allows the water stop valve to be easily removed without damaging the molded one-piece or unitary stub out and rough-in plumbing valve cylinder and the water stop valve.

It is another object of the present invention to provide the molded one-piece or unitary stub out and rough-in plumbing valve cylinder as a single stub out valve unit upon inserting a stub out water line having an outlet end and an inlet end through the open end of the integral mounting plate and into the integral conduit member within the inner cylindrical rear cavity and out through the inner off-set cavity with the outlet end of the stub out water line extending a selected distance there beyond, and the inlet end of the stub out water line extending a selected distance beyond the open end of the integral mounting plate. The outlet end of the stub out water line is sealingly connected to the compression inlet of the water stop valve or quarter-turn water stop valve that supplies water flow to the outlet of the water stop valve or quarter-turn water stop valve that is connected to water fixtures such as toilets, kitchen sinks, showers, bath tubs, basins, vanities, and outside water hydrants to name just a few. Also, the inlet end of the stub out water line that extends a selected distance beyond the open end of the integral mounting plate is connected to either "L" or "T" shaped fittings.

A further object of the present invention provides the integral conduit member with a first cylindrical diameter section and a second diameter section, the first cylindrical diameter section is defined by the inner cylindrical wall member of the inner off-set cavity that extends therefrom and into the integral rear cylindrical cavity, which extends through the inner cylindrical rear wall surface disposed on the opposite side of the front cylindrical face to a selected distance therein, and terminating into an inner rear cylindrical face. The second diameter section is integrally attached to the inner rear cylindrical face of the first cylindrical diameter section, which extends slightly inward of the outer circumference of the first cylindrical diameter section, and along the second diameter section extending through the integral rear cavity to a selective distance beyond the open end of the integral mounting plate member. Moreover, the second diameter section comprises a top flat portion that extends from the inner rear cylindrical face of the first cylindrical diameter section to the selective distance beyond the open end of the mounting plate member, the top flat portion includes a pair of flange edge members at opposite ends thereof, and a pair of flat side portions are formed on opposite sides of the second diameter section. Each of the flat side portions having an upper end integrally connected to the pair of flange edge members at the opposite ends of the flat side portions, and a lower end connected to an integrally formed bottom semi-circular portion. The first cylindrical diameter section and the second diameter section of the integral conduit member includes an integral passageway formed therethrough for receiving stub out water lines.

Another object of the present invention is to further provide the top flat portion, the pair of flange edge members, and each of the flat side portions of the second diameter section for self-leveling the molded one-piece or unitary stub out and rough-in plumbing valve cylinder when the mounting plate member is attached directly to vertical or horizontal wall framed studs. Also, the first diameter section and the second diameter sections of the integral conduit member includes a plurality of support members disposed along at least a portion thereon. In addition, the plurality of support members are disposed within the inner cylindrical rear cavity for rigidly supporting the integral conduit member therein.

Also, a pair of the plurality of support members comprises a first elongated side edge, a second elongated side edge, a first front edge, and a second rear edge. Further, the first elongated side edge and the second elongated side edge are integrally joined together at a front end by the first front edge and at a rear end by the second rear edge that form unitary support members on opposite sides of the first cylindrical diameter section and the integrally attached second diameter section of the integral conduit member. The first elongated side edge of the pair of the plurality of support members are integrally attached along the first cylindrical diameter section and the second diameter section on opposite sides thereof, and along a portion of the inner rear cylindrical face of the first cylindrical diameter section at a junction of the first cylindrical diameter section and the second diameter section on opposite sides thereof. Next, each of the second elongated side edge of the pair of the plurality of support members are spaced from each of the first elongated side edge of the pair of the plurality of support members, which are integrally attached along the inner cylindrical rear cavity wall surface on opposite sides of the first cylindrical diameter section by the first front edge, and extending integrally therefrom and along the inner cylindrical rear side wall of the inner cylindrical rear cavity and joined at the open end of the integral mounting plate member by the second rear edge at one end thereof and the other end thereof being integrally attached to each of the first elongated side edges that is integrally joined to each of the flat side portions of the second diameter section of the integral conduit member on opposite sides thereof.

A further object of the present invention provides the plurality of support members with an additional support member comprising top and bottom elongated edges, a front vertical edge and a rear vertical edge. A front end of the top and elongated edges are integrally joined by the front vertical edge to a bottom central portion of the inner rear cylindrical face of the first cylindrical diameter section, and a rear end of the top and elongated edges are integrally joined by the rear vertical edge at a bottom central portion at the open end of the integral mounting plate member. The top elongated edge extends from a bottom central portion of the inner rear cylindrical face of the first cylindrical diameter section, and extends along a bottom surface of the semi-circular portion of the second diameter section and terminating at the open end of the integral stub out mounting plate, while simultaneously spacing the second diameter section above the bottom wall of the inner cylindrical rear cavity. Finally, the plurality of support members further includes a bottom portion of the first cylindrical diameter section that is integrally molded to and supported on the bottom wall of the inner cylindrical rear cavity extending from a bottom portion of the inner cylindrical rear cavity wall surface. Note that the plurality of support members makes the integral conduit member rigidly supported against movement and vibration within the molded one-piece or unitary stub out and rough-in plumbing valve cylinder. Also, the plurality of support members maintain the stub out water lines that is received through the passageway of the integral conduit member for rigidly supporting them against bending, sagging, flexing, and vibration whenever water flows through the stub out water lines.

A further object of the present invention provides a bevel surface disposed between the flange edge members at opposite side ends of the top flat portion and at the upper end of the flat side portions on opposite sides of the second diameter section of the integral conduit member, and each of the flat side portions forms a first leveling feature for self-leveling the molded one-piece or unitary stub out and rough-in plumbing valve cylinder when the integral stub out mounting plate is ready to be attached directly to vertical or horizontal wall framed stud members, singular or in combination therewith. This first self-leveling feature is achieved by placing one of the flat side portions that extend a selective distance beyond the open end of the integral stub out mounting plate directly against a side face of a vertical wall framed stud member and securing the integral mounting thereto by inserting a pair of nails or screws into a pair of vertical holes disposed along a peripheral edge thereon. If the integral stub out mounting plate is positioned along the bevel surface relative to the side face of the vertical wall framed stud member, this means that the integral mounting plate member is not level or flush and is cocked or tilted relative to the side face of the vertical wall framed stud member. Also, a second self-leveling feature is defined by the top flat portion that extends a selective distance beyond the open end of the stub out mounting plate. Further, the second self-leveling feature is achieved by positioning the top flat portion directly underneath a bottom face of the horizontal wall framed stud member and securing the integral mounting thereto by inserting a pair of nails or screws into at least a pair of horizontal holes disposed along a top peripheral edge thereon. Moreover, the mounting holes in the integral mounting plate member are discussed in greater details later.

In a similar second embodiment, a further object of the present invention provides the molded one-piece or unitary stub out and rough-in plumbing valve cylinder with an integral conduit member with a first cylindrical diameter section and a second cylindrical diameter section, the first cylindrical diameter section is defined by the inner cylindrical wall member of the inner off-set cavity that extends therefrom and into the inner cylindrical rear cavity, which extends through the inner cylindrical rear wall surface disposed on the opposite side of the front cylindrical face to a selected distance therein and terminating into an inner rear cylindrical face. The second cylindrical diameter section is integrally attached to the inner rear cylindrical face of the first cylindrical diameter section, which extends inward of the outer circumference of the first cylindrical diameter section, and the second cylindrical diameter section extending through the inner cylindrical rear cavity to a selective distance beyond an open end of an integral stub out mounting plate. The first cylindrical diameter section having a bottom portion that is integrally molded to a bottom portion of the inner cylindrical rear cavity. Moreover, the first and second cylindrical diameter sections comprises a top flat portion that is integrally joined to the inner cylindrical rear wall surface, and extending along opposite sides of the first cylindrical diameter section, across an entire upper portion of the inner rear cylindrical face of the first cylindrical diameter section, continuously extending along an entire top portion of the second cylindrical diameter section to a selective distance beyond the open end of the integral stub out mounting plate, and integrally extending outwardly from the top flat portion, which is connected to and extending along the opposite side walls of the inner cylindrical rear cavity to the open end of the integral stub out mounting plate member.

A further object of the second embodiment of the present invention further provides the outward extending top flat portion with a pair of flange edge members at opposite ends thereof, the top flat portion and the pair of flange edge members are formed as an integral and unitary U-shaped member having outward and downward opposite side leg portions extending from the top flat portion having an inner and outer flat surfaces disposed thereon. Also, the outward and downward opposite side leg portions are integrally joined by an inner end thereof to the inner cylindrical rear wall surface, while extending and joined along opposite cylindrical side walls of the inner cylindrical rear cavity by the outer flat surfaces of the outward and downward opposite side extending leg portions, and along a portion of a rear wall of the integral stub out mounting plate at opposite locations thereon. Extending from the rear wall portion of the integral stub out mounting plate defines an outer end that defines the selective distance beyond the open end of the integral stub out mounting plate.

Another object of the second embodiment of the present invention is to further provide the unitary U-shaped member formed by the top flat portion, and the outward and downward extending leg portions are defined as a leveling device for self-leveling the molded one-piece or unitary stub out and rough-in plumbing valve cylinder when the integral mounting plate is attached directly to vertical or horizontal wall framed stud members. Further, the first and second cylindrical diameter section of the integral conduit member includes a plurality of integral support members disposed thereon, and a pair of the plurality of integral support members having one side disposed along and integrally attached to the opposite cylindrical sides of the first cylindrical diameter section that extend from the inner cylindrical rear wall surface, across the inner rear cylindrical face of the first cylindrical diameter section of the integral conduit member, and along opposite cylindrical sides of the second cylindrical diameter section of the integral conduit member to the open end of the integral stub out mounting plate. In addition, the pair of integral support members having another side disposed and integrally attached to and extending along the inner flat surface of the outward and downward extending leg portions of the U-shaped member between the inner cylindrical rear wall surface of the inner rear cylindrical cavity and end contiguous to the open end of the integral stub out mounting plate for rigidly supporting the integral conduit member of the first and second diameter sections within the inner rear cylindrical cavity. A lower integral support member is integrally attached to a bottom portion of the second cylindrical diameter section, which extends from the inner rear cylindrical face of the first cylindrical diameter section to the open end of the integral stub out mounting plate. Also, the integral support members space the outward and downward extending leg portions from and support the second diameter section above the bottom inner cylindrical wall surface of the inner rear cylindrical cavity. Moreover, these integral support members will provide a firm support to stub out water lines against movement, bending and flexing within the integral conduit member.

A further object of the second embodiment of the present invention provides the outward and downward extending leg portions and the top flat portion of the U-shaped member being extended to a selective distance beyond the open end of the integral stub out mounting plate. The outward and downward extending leg portions that extends outside of the open end of the integral stub out mounting plate include front and rear ends with the front ends thereof integrally attached or molded to and along a rear surface of the integral stub out mounting plate and contiguous to the open end of the integral stub out mounting plate.

In both embodiments, it is a further object of the present invention to provide the integral stub out mounting plate with a plurality mounting holes extending through a front surface and through the rear surface of the integral stub out mounting plate. The mounting holes comprises at pair of selectively spaced apart mounting holes disposed along and contiguous to opposite peripheral vertical sides of the integral stub out mounting plate, and a pair of selectively spaced apart mounting holes disposed contiguous to a top horizontal side of the mounting plate member. Each one of the pair of selectively spaced apart mounting holes disposed contiguous to the opposite peripheral vertical sides having one of the selectively spaced apart mounting holes disposed near the top horizontal side of the integral stub out mounting plate, and is positioned below the pair of selectively spaced apart mounting holes that are disposed contiguous to the top horizontal side of the integral stub out mounting plate. The other one of the pair of selectively spaced apart mounting holes that are disposed contiguous to the opposite peripheral vertical sides are disposed along and contiguous to a bottom horizontal side of the integral stub out mounting plate. Also, the integral stub out mounting plate has a configuration defining a square-like or rectangular-like shape. However, the integral stub out mounting plate configuration can take on other types of shapes, if desired. This integral stub out mounting plate is disposed about and integrally attached or molded to the one-piece or unitary stub out and rough-in plumbing valve cylinder at a rear end opening of the inner cylindrical rear cavity thereof that defines the open end of the mounting plate member.

In both embodiments, a further object of the present invention provides the pair of selectively spaced apart mounting holes disposed along and contiguous to the opposite peripheral vertical sides are to be used when a plumber is ready to attach the integral stub out mounting plate of the one-piece or unitary stub out and rough-in plumbing valve cylinder directly to vertical wall framed stud members. Also, either one or both of the selectively spaced apart mounting holes that are disposed near the top horizontal side can be used when a plumber is ready to attach the mounting plate member of the one-piece or unitary stub out and rough-in plumbing valve cylinder directly to horizontal wall framed stud members that are disposed between a pair of vertical wall framed stud members.

Moreover, it is yet a further object of the present invention to provide the one-piece or unitary stub out and rough-in plumbing valve cylinder, a stub-out water line disposed therein, and a water stop valve device, such as a quarter-turn valve member can be assembled as a single stub out valve unit to be installed during the "rough-in phase" by a plumber. This single stub out valve unit will allow the plumber to easily assemble water distribution supply pipelines and the attachment of water fixtures thereto without any post installation of sweating, re-sweating of "T" or "L" pipe fittings, or turning a main water supply on and off numerous times.

A further object of the present invention provides a method of assembling the single stub out valve unit during the "rough-in phase", comprises the steps of providing a one-piece or unitary stub out and rough-in plumbing valve cylinder and a water stop valve member that forms the single stub out valve unit. First, a copper stub out water line having a blocked end, and an opposite end having an open 90 degree bend with the blocked end initially passing through the aforementioned integral conduit member at the open end of the integral stub out mounting plate and out through the off-center or off-set hole or opening disposed within the front inner off-set cavity of the single stub out valve unit, and extending to a selective distance there from. If the stub out water line is a straight plastic type member having a capped end and a straight open end, then the straight open end passes through the front inner off-set cavity and through the off-center or off-set hole or opening, and through the integral conduit member that extends a selective distance beyond the mounting plate member open end. Next, a plumber cuts off the blocked end and/or the capped end of the different types of stub out water lines so that the water stop valve device, such as, a quarter-turn valve member can be attached to a compression inlet end of a base end portion thereof. The selection of the quarter-turn valve member that includes a compression nut fitting at the compression inlet end uses a compression nut to secure the stub out water line thereto. Upon, securing one end of the compression nut to the compression nut fitting of the base end portion, the other end of the compression nut will sealingly abut externally against the front cylindrical face of the one-piece or unitary stub out and rough-in plumbing valve cylinder, and covering the front inner off-set cavity thereof. This allows easy access to the compression nut for easy removal of the quarter-turn valve member from the stub out water line to obviate any damage to the single stub out valve unit.

Another object of the present invention provides the method of assembling the single stub out valve unit during the "rough-in phase", comprises the steps of further providing the option of utilizing either a thread compression coupling nut with a sealing member releasable attached to a base end portion of a quarter-turn valve or a push-to-connect type quarter-turn valve that includes a base end portion with a releasable compression fitting having a sealing member disposed therein. Next, after the plumber has cut off the blocked end and/or the capped end of the different types of stub out water lines, then he simply inserts the cut off ends of the different types of stub out water lines into either the threaded compression coupling nut with the sealing member therein or into the releasable compression fitting allowing either the threaded compression coupling nut with the sealing member therein or the releasable compression fitting with the sealing member therein to tightly seal around the cut off ends of the different types of stub out water lines, while simultaneously compressing the either one of the sealing members thereabout. Finally, after the different types of stub out water lines are secured within either the threaded compression coupling nut or the releasable compression fitting, then either the threaded compression coupling nut or the base end portion of the releasable compression fitting abuts and seals about the front cylindrical face of the single stub out valve unit. Note that this push-to-connect quarter-turn type valve needs no soldering, clamps, unions, glue, or no special tools are required to connect the different types of stub out water lines to the push-to-connect type quarter-turn valve. Finally, after installation, either the threaded compression coupling nut can be easily removed by unthreading from the quarter-turn valve or the push-to-connect type quarter-turn valve and the releasable compression fitting can be easily removed or changed by using a disconnect tool.

Moreover, another object of the present invention provides the method of assembling the single stub out valve unit during the "rough-in phase", comprises the steps of the plumber attaching the mounting plate member of the single stub out valve unit directly to the vertical or horizontal wall framed stud members by at least a pair of securing members, such as a nail or screw via a plurality of mounting holes in the mounting plate member, while simultaneously self-leveling the single stub out valve unit relative to the vertical or horizontal wall framed stud members. This happens, when the self-leveling member of the integral conduit member that defines the top flat portion with the flange edge members, and the flat side portions that extends therefrom at least along the selective distance beyond the integral stub out mounting plate by placing one of the flat side portions that extends from the flange edge members directly against a side portion of the vertical wall framed stud members or when the top flat portion engages or abuts directly against a bottom portion of the horizontal wall framed stud members before attaching the integral stub out mounting plate to the vertical or horizontal wall framed stub members. Once these steps have been completed, the plumber provides a "T" or "L" fitting that includes a pair of ends, one end is attached to an inlet of the integral conduit member that extends beyond the open end of the mounting plate member and the other end is attached to an outlet of a main water distribution supply line. A more detailed description of the mounting of the single stub out valve unit to the vertical or horizontal wall framed stub members will be discussed in greater details later under the "Detailed Description".

Another object of the present invention provides the following method step during the "rough-in phase", the plumber will cut off the main water supply at the water meter. Next, the plumber will turn off all of the quarter-turn valves, and then turn the main water supply on at the water meter, during the "rough-in phase". Thereafter, the plumber will check for any water leaks at all "T" and "L" fittings and quarter-turn valves, and if no leaks are detected the plumber will turn the main water supply off at the water meter. Also, all of the water stop valves, such as the quarter-turn valves will remain off until the plumber comes back during the "trim-out phase". Note that these method steps will keep plumbers from ever having to come back multiple times and lying on their backs in tight and uncomfortable spaces underneath vanities, cabinets, crawl spaces, and basement utility areas to dry and re-sweat, solder or weld pipe joints and installing water stop valve devices, such as quarter-turn valve devices. Finally, before the plumbers leave the site during their last "rough-in" phase job, and prior to the work of the carpenters, painters, drywall installation, and floor and cabinetry installation for kitchens and bathrooms, then the plumbers will place a protective cover over the quarter-turn valve and the attached single stub out valve unit to protect against paint and damage thereto. This above method step of assembling and the reduced labor time for plumbers are major key benefits of the single stub out valve unit design that has been discussed above.

Now, a further object of the present invention provides the "trim-out phase", which begins by cutting a hole in a piece of drywall material by drywall installers or carpenters with a diameter that is slightly larger than the protective cover disposed over the molded one-piece or unitary stub out and rough-in plumbing valve cylinder with a quarter-turn valve device attached thereto. This hole allows the drywall material to easily slide tightly across the outer circumference of the protective cover disposed over the molded one-piece or unitary stub out and rough-in plumbing valve cylinder and the attached quarter-valve device until the drywall material abuts against the integral stub out mounting plate of the molded one-piece or unitary stub out and rough-in plumbing valve cylinder with the attached quarter-valve device without leaving a sizable gap or space there between. When the drywall material abuts against the mounting plate member of the molded one-piece or unitary stub out and rough-in plumbing valve cylinder with the attached quarter-valve device, the drywall can now be securely attached to the vertical or horizontal wall framed studs. After the drywall material has been hung, the drywall installers or carpenters can install vanities and cabinets by cutting holes therein having a diameter that is slightly larger than the diameter of the protective disposed overt the molded one-piece or unitary stub out and rough-in plumbing valve cylinder with the attached quarter-valve device without ever having to remove a valve handle of the quarter-valve device, wherein the vanities and cabinets can easily slide tightly across the protective cover disposed over the molded one-piece or unitary stub out and rough-in plumbing valve cylinder with the attached quarter-valve device until they abut against the drywall material leaving no sizable gaps or spacing between the vanities and cabinets and device the molded one-piece or unitary stub out and rough-in plumbing valve cylinder with the attached quarter-turn valve without ever having to remove the valve handle.

Furthermore, the next step of the "trim-out phase" of the present invention happens after carpenters have hung all doors, installed all base and ceiling trims, painters have painted all drywalls, doors, and trims, all flooring has been installed, and all kitchen and bathroom cabinetry including countertops have been installed, as well as any touch-up jobs by the carpenters and painters. Once this work has been completed, the plumbers return to finish up the final steps of the "trim-out phase". First, the plumbers will remove all protective covers disposed over the molded one-piece or unitary stub out and rough-in plumbing valve cylinder with the attached quarter-turn valve and install the trim rings. After this has been done, the plumbers will then attach water supply lines to all valves and faucets, toilets, and other water fixtures or appliances to establish water flow there between. Finally, the plumber can test all valves and faucets, toilets, and other water fixtures or appliances and connections for any water leaks by turning the valve handle of the quarter-turn valve devices to a valve open position to establish water flow to all valves and faucets, toilets, and other water fixtures or appliances. If no water leaks are detected, then water flow may be permanently established to all valves and faucets, toilets, and other water fixtures or appliances by actuating the valve handle of the quarter-turn valve to a valve open position. These final steps complete the "trim-out phase" for the plumbers, which has saved the plumbers cost and labor time.

Note that the above installation of the trim rings allows the trim rings to be slidably received over and along the outer circumference of molded one-piece or unitary stub out and rough-in plumbing valve cylinders with attached quarter-turn valves without ever having to remove the valve handles. As the trim rings slide along the molded one-piece or unitary stub out and rough-in plumbing valve cylinders with the attached quarter-turn valves, they will abut against drywall material, and back inner walls of vanities and cabinets to hide any imperfections or gaps in the cut holes in the drywall material and the cut holes in the inner back walls of the vanities and cabinets relative to the outer circumference of the molded one-piece or unitary stub out and rough-in plumbing valve cylinders with the attached quarter-turn valves. Once the plumbers or users have fully installed the trim rings, they will be secured to the outer circumference of the molded one-piece or unitary stub out and rough-in plumbing valve cylinders with the attached quarter-turn valves by at least a pair of set screw members.

Additional aspects, objectives, features, benefits, and advantages of the present invention, which relates to a new and useful improvement of a molded one-piece or unitary stub out and rough-in plumbing valve cylinder with an attached quarter-turn valve will become better understood with regard to the following detailed description and the appended claims of the preferred embodiments made in connection to the accompanying drawings.

BRIEF DESCRIPTION OF THE DRAWINGS

The present invention may be better understood, along with its numerous objects, features, and advantages made apparent to those skilled in the art by referencing the accompanying drawings, in which:

FIG. 25 illustrates a perspective view of the pair of trim rings as described in FIG. 24 that have been fully received over the quarter-turn water stop valves, the pair of the unitary stub-out and rough-in plumbing valve cylinders, and in sliding abutting engagement with the attached drywall structure or the like, which have closed off any space that existed between the plurality of spaced apart cut-out holes in the attached drywall structure or the like, and the pair of the unitary stub-out and rough-in plumbing valve cylinders according to the present invention.

FIG. 26 illustrates a rear isometric view of the trim ring as described in FIGS. 24 and 25 with a securing hole and set screw according to the present invention.

FIG. 27 illustrates a front isometric view of the trim ring as described in FIGS. 24 and 25 with a securing hole according to the present invention.

DETAILED DESCRIPTION

The present invention defines an improved molded unitary stub out and rough-in plumbing valve cylinder assembly designed for plumbing fixtures and water stop valves that includes an off-set front cavity with an off-set conduit opening therein, an integral internal off-set conduit that extends from the off-set conduit opening through a rear cylindrical member disposed within an integral rear cylindrical cavity within the improved molded unitary stub out and rough-in plumbing valve cylinder assembly, and the integral internal off-set conduit having a rear portion that extends from the rear cylindrical member to a selective distance beyond an open end of an integral stub out wall mounting plate attached at the rear of the improved molded unitary stub out and rough-in plumbing valve cylinder assembly.

The integral internal conduit is supported and connected by a plurality of support members within and along the integral rear cylindrical cavity, the rear cylindrical member, and at the open end of the integral stub out wall mounting plate to provide rigid support for water supply lines or tubing that are received within the rear cylindrical member, the integral internal off-set conduit and the extended rear portion of the integral internal off-set conduit against movement, vibration, flexing and bending therein. Further, the integral rear conduit member includes a leveling member along a portion thereof to level the improved molded unitary stub out and rough-in plumbing valve cylinder assembly for enabling plumbers or users to easily level and directly mount the unitary stub out and rough-in plumbing valve cylinder assembly directly to wall framed studs during a rough-in phase plumbing of a residential or commercial building without ever having to use mounting straps, strips, bars or plates, which saves time and money.

Figure 1:
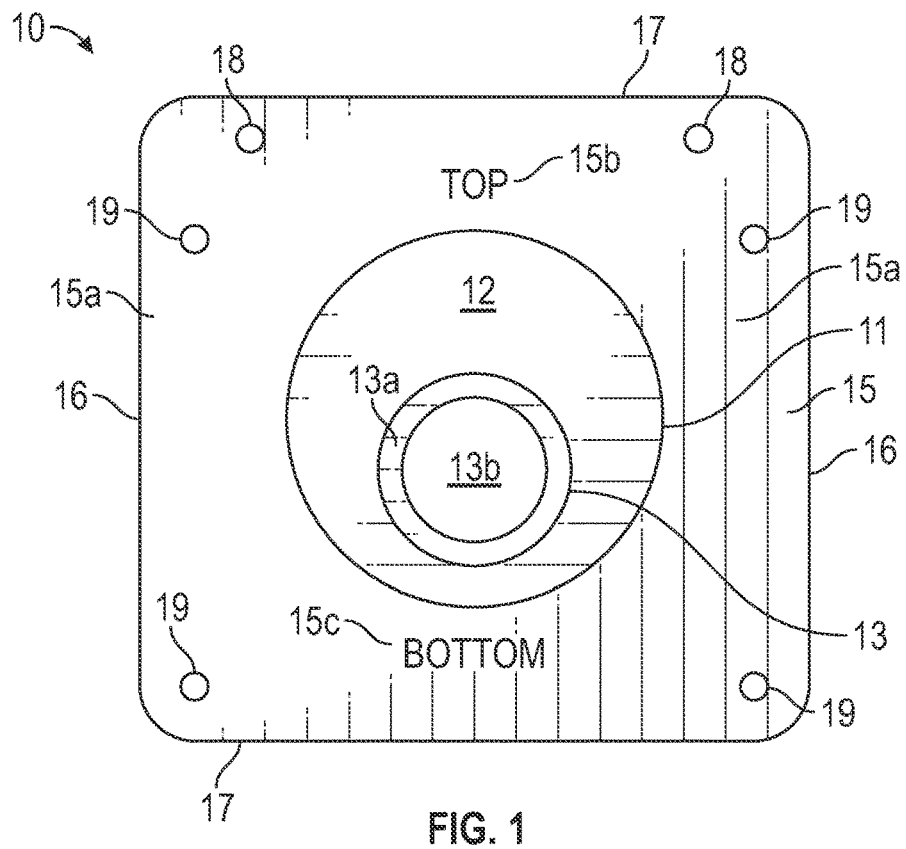
FIG. 1 illustrates a front perspective view of a first embodiment of a unitary stub-out and rough-in plumbing valve cylinder having an integral stub out mounting plate with an integral internal cavity having a conduit extending therefrom defining support and leveling flange members thereon according to the present invention.

In the perspective view as shown FIG. 1, the new and improved molded one-piece or unitary stub out and rough-in plumbing valve cylinder assembly 10 including a cylindrical member 11 having a front cylindrical face 12 with a front inner off-set cavity 13 of a certain depth disposed therein, which extends to an inner cylindrical wall member 13a forming an off-set conduit opening defining an integral conduit member 13b that extends therefrom and into an integral inner cylindrical rear cavity (not shown). The cylindrical member 11 further includes an integral stub out wall mounting plate 15 attached thereto with a front face 15a, a top indicia 15b, a bottom indicia 15c, a pair of opposite side portions 16, top and bottom ends 17, a plurality of spaced apart securing or mounting holes 18 disposed along a top peripheral edge of the integral stub out wall mounting plate 15, and a plurality of spaced apart securing or mounting holes 19 disposed along opposite peripheral edges of the integral stub out wall mounting plate 15. Note that the top indicia 15b and the bottom indicia 15c are placed on the front face 15a so that a plumber or user will mount the integral stub out wall mounting plate 15 correctly to a wall framed stud so that a rear self-leveling member of the integral conduit member 13b will be positioned properly relative to the wall framed stud. Details of the rear self-leveling feature of the integral conduit member 13b will be discussed later.

Figure 2:
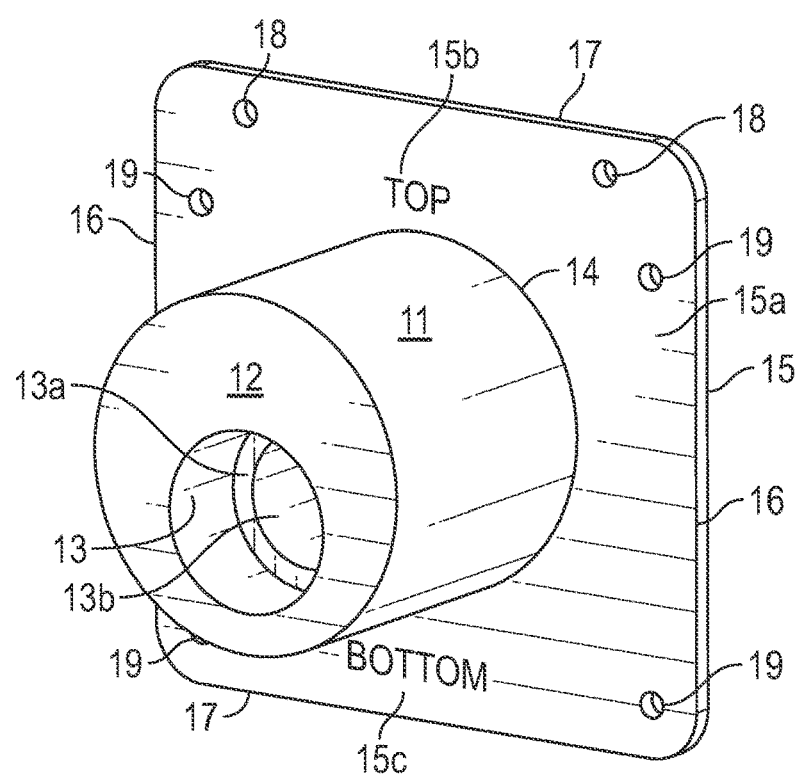
FIG. 2 illustrates an isometric view of the first embodiment of the unitary stub-out and rough-in plumbing valve cylinder having an integral stub out mounting plate with an integral internal cavity having a conduit extending therefrom defining support and leveling flange members thereon according to the present invention.

The isometric view of FIG. 2, shows the same reference numerals as indicated above for the new and improved molded one-piece or unitary stub out and rough-in plumbing valve cylinder assembly 10 as set forth in FIG. 1, except for showing an integral rear end 14 of the cylindrical member 11 that is integrally attached to the front face 15a of the integral stub out wall mounting plate 15. By omitting the other reference numerals in FIG. 2 eliminates redundancy.

Figure 3:
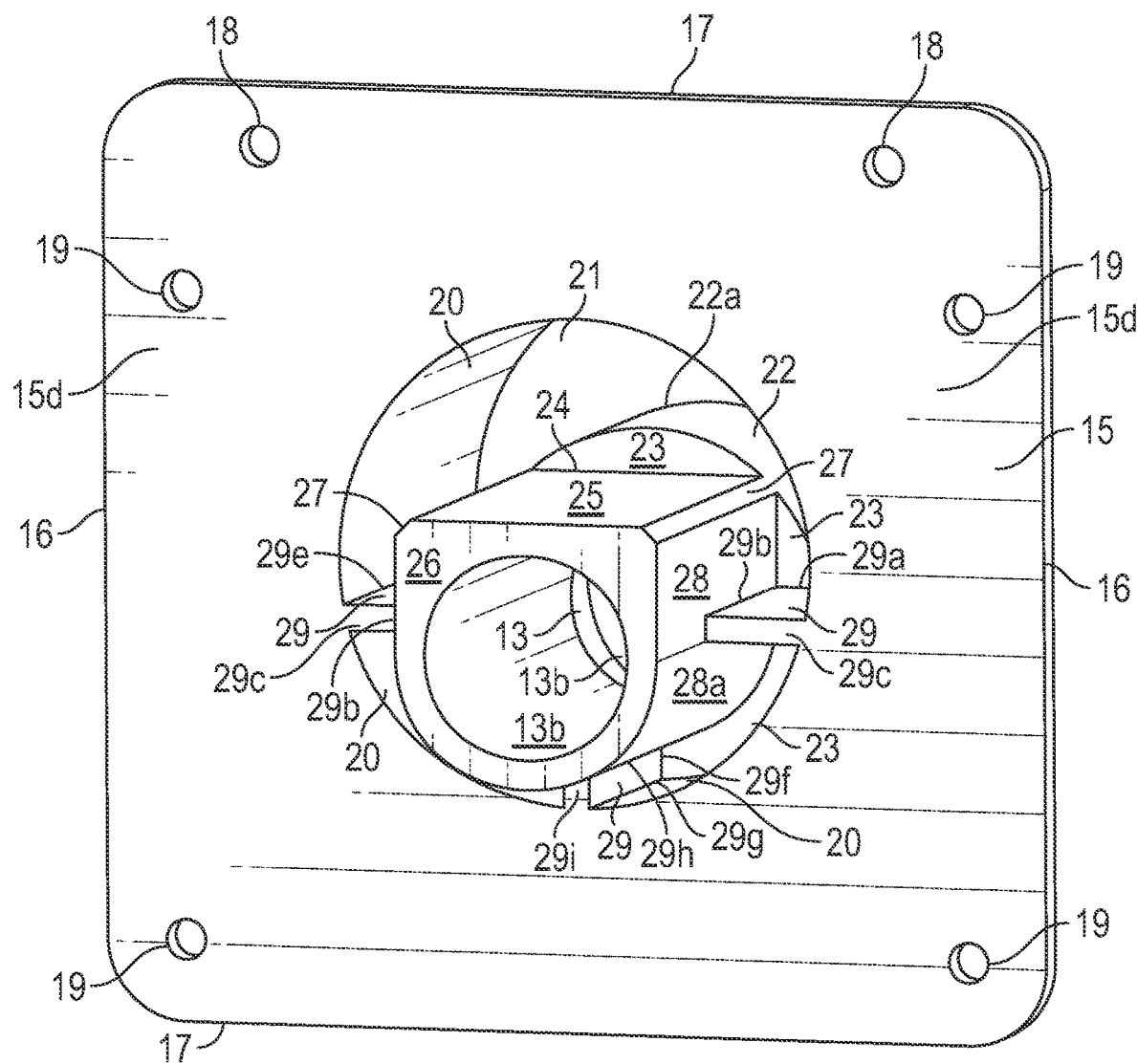
FIG. 3 illustrates a rear isometric view of the first embodiment of the unitary stub-out and rough-in plumbing valve cylinder having an integral stub out mounting plate with an integral internal conduit extending a selective distance beyond the integral stub out mounting plate defining support and leveling flange members thereon according to the present invention.

FIG. 3 shows an isometric view of a first embodiment of the rear end of the new and improved molded one-piece or unitary stub out and rough-in plumbing valve cylinder assembly 10 with the rear self-leveling feature of the integral conduit member 13b is defined by the first cylindrical diameter section 22 and the second diameter section 24. The second diameter section 24 is disposed slightly inward of the outer circumference of the first cylindrical diameter section 22, and extending through the integral rear cylindrical cavity 20 to a selective distance beyond an open end of the integral stub out wall mounting plate 15. Moreover, the second diameter section comprises a top flat portion 25 that extends from the inner rear cylindrical face 23 of the first cylindrical diameter section 22 to the selective distance beyond the open end of the stub out wall mounting plate 15 that terminates in a rear end face 26, the top flat portion 25 includes a pair of flange edge members 27 at opposite ends thereof, and a pair of flat side portions 28 are formed on opposite sides of the second diameter section 24. The integral conduit member 13b is formed through a first cylindrical diameter section 22 and a second diameter section 24. Also, the first cylindrical diameter section 22 having a front end 22a integrally attached to an inner cylindrical rear wall surface 21 of an integral rear cylindrical cavity 20 disposed on an opposite side of the front cylindrical face 12 of the cylinder member 11. The first cylindrical diameter section 22 is defined by the inner cylindrical wall member 13a of the front inner off-set cavity 13 that extends therefrom and into the integral inner rear cylindrical cavity 20, which extends through the inner cylindrical rear wall surface 21 to a selected distance within the integral inner rear cylindrical cavity 20, and terminating into an inner rear cylindrical face 23. The second diameter section 24 having a front end 24a that is integrally attached to the inner rear cylindrical face 23 of the first cylindrical diameter section 22. Each one of the flat side portions 28 having an upper end integrally connected to the pair of flange edge members 27 at the opposite ends of the flat side portions 28, and a lower end connected to an integrally formed bottom semi-circular portion 28a. The first cylindrical diameter section 22 and the second diameter section 24 of the integral conduit member 13a forms an integral passageway therethrough for receiving stub out water lines therein.

Further in FIG. 3, the top flat portion 25, the pair of flange edge members 27, and each of the flat side portions 28 of the second diameter section 24 defines the self-leveling feature of the molded one-piece or unitary stub out and rough-in plumbing valve cylinder 10 when the stub out wall mounting plate 15 is attached directly to a vertical or horizontal wall framed studs as shown in FIGS. 9-20, which will be discussed in greater details later. Also, the first cylindrical diameter section 22 and the second diameter section 24 of the integral conduit member 13a includes a plurality of support members 29 disposed along at least a portion thereon. In addition, the plurality of support members 29 are disposed within the inner cylindrical rear cavity for rigidly supporting the integral conduit member 13a, the first cylindrical diameter section 22, and the second diameter section 24 herein.

Moreover, a pair of the plurality of support members 29 comprises a first inner elongated side edge 29a, 29a' and 29b including a first straight edge 29a', an intermediate edge 29a, a second straight edge 29b, and a second outer elongated side edge 29e. Further, the first inner elongated side edge 29a, 29a' and 29b and the second outer elongated side edge 29e are integrally joined together at a front end by a first front edge 29d and at a rear end by a second rear edge 29c that form unitary support members 29 on opposite sides of the first cylindrical diameter section 22 and the integrally attached second diameter section 24 of the integral conduit member 13b. The first straight edge 29a' of the pair of the plurality of support members 29 are integrally attached along the sides of the first cylindrical diameter section 22, the intermediate edge 29a is integrally attached along a portion of the inner rear cylindrical face 23 of the first cylindrical diameter section 22 contiguous to the outer periphery of the first cylindrical diameter section 22, the second straight edge 29b is integrally attached along the sides of the second diameter section 24 on opposite sides thereof. Next, each one of the second elongated side edges 29e of the pair of the plurality of support members 29 are spaced apart from each one of the first elongated side edges 29a, 29a' and 29b of the pair of the plurality of support members 29 by being integrally joined together at the front end by the first front edge 29d and at the rear end by the second rear edge 29c. The first front edge 29d is integrally attached to the inner cylindrical rear cavity wall surface 21 on opposite sides of the first cylindrical diameter section 22, and each one of the second elongated side edges 29e extending integrally therefrom and along an inner cylindrical side wall surface of the inner cylindrical rear cavity 20 and integrally attached at the open end of the integral stub out wall mounting plate 15 that terminates at one end of the second rear edge 29c, while the other end thereof being integrally attached to each one of the second straight edges 29b of the first elongated side edges 29a, 29a' and 29b that is integrally attached to each of the flat side portions 28 of the second diameter section 24 of the integral conduit member 13b on opposite sides thereof.

The plurality of support members 29 includes an additional support member comprising a top elongated edge 29h, a bottom elongated edge 29g, a front vertical edge 29f, and a rear vertical edge 29i. A front end of the top elongated edge 29h and the bottom elongated edge 29g are integrally joined by the front vertical edge 29f to a bottom central portion of the inner rear cylindrical face 23 of the first cylindrical diameter section 22, and a rear end of the top elongated edge 29h and the bottom elongated edge 29g are integrally joined by the rear vertical edge 29i at a bottom central portion of the inner cylindrical side wall surface of the inner cylindrical rear cavity 20 at the open end of the integral stub out wall mounting plate 15. The top elongated edge 29h extends from a bottom central portion of the inner rear cylindrical face 23 of the first cylindrical diameter section 22, and extends along a bottom surface of the semi-circular portion 28a of the second diameter section 24 and ending at the open end of the integral stub out wall mounting plate 15, while simultaneously spacing the second diameter section 24 above the inner cylindrical side wall surface of the inner cylindrical rear cavity 20 at the bottom thereof. Finally, the plurality of support members 29 further includes a bottom portion of the first cylindrical diameter section 22 that is integrally molded to and supported on the inner cylindrical side wall surface of the inner cylindrical rear cavity 20 at the bottom thereof, and extending from a bottom portion of the inner cylindrical rear cavity wall surface 21 to a bottom portion of the inner rear cylindrical face 23 of the first cylindrical diameter section 22. Note that the plurality of support members 29 makes the integral conduit member 13a rigidly supported against movement and vibration within the molded one-piece or unitary stub out and rough-in plumbing valve cylinder 10. Also, the plurality of support members 29 maintains the stub out water lines that is received through the passageway of the integral conduit member 13a for rigidly supporting the stub out water lines against bending, sagging, flexing, and vibration whenever water flows through the stub out water lines.

As further shown in FIG. 3, the top flat portion 25 provides a bevel surface 27 disposed between opposite side ends of the top flat portion 25 and the upper end of the flat side portions 28 on opposite sides of the second diameter section 22 of the integral conduit member 13a. Each of the flat side portions 28 on opposite sides of the second diameter section 22 forms a first leveling feature for self-leveling the molded one-piece or unitary stub out and rough-in plumbing valve cylinder 10 when the integral mounting plate member 15 is ready to be attached directly to vertical or horizontal wall framed stud members, singular or in combination therewith. This first self-leveling feature is achieved by placing one of the flat side portions 28 that extends a selective distance beyond the open end of the integral stub out wall mounting plate 15 directly against a side face of a vertical wall framed stud member and securing the integral stub out wall mounting plate 15 thereto by inserting a pair of nails or screws into a pair of vertical mounting holes 19 disposed along a peripheral edge thereon. If the integral mounting plate member is positioned along the bevel surface 27 relative to the side face of the vertical wall framed stud member, this means that the integral stub out wall mounting plate 15 is not level or flush and is cocked or tilted relative to the side face of the vertical wall framed stud member. Also, a second self-leveling feature is defined by the top flat portion 25 that extends a selective distance beyond the open end of the integral stub out wall mounting plate 15, upon the top flat portion 25 being positioned directly underneath a bottom face of a horizontal wall framed stud member and securing the integral stub out mounting plate 15 thereto by inserting a pair of nails or screws into at least a pair of horizontal mounting holes 18 disposed along a top peripheral edge thereon. Moreover, the mounting holes 18 and 19 in the integral stub out wall mounting plate member 15 and the mounting relationship to vertical or horizontal wall framed stud members will be discussed in greater details later.

Figure 4:
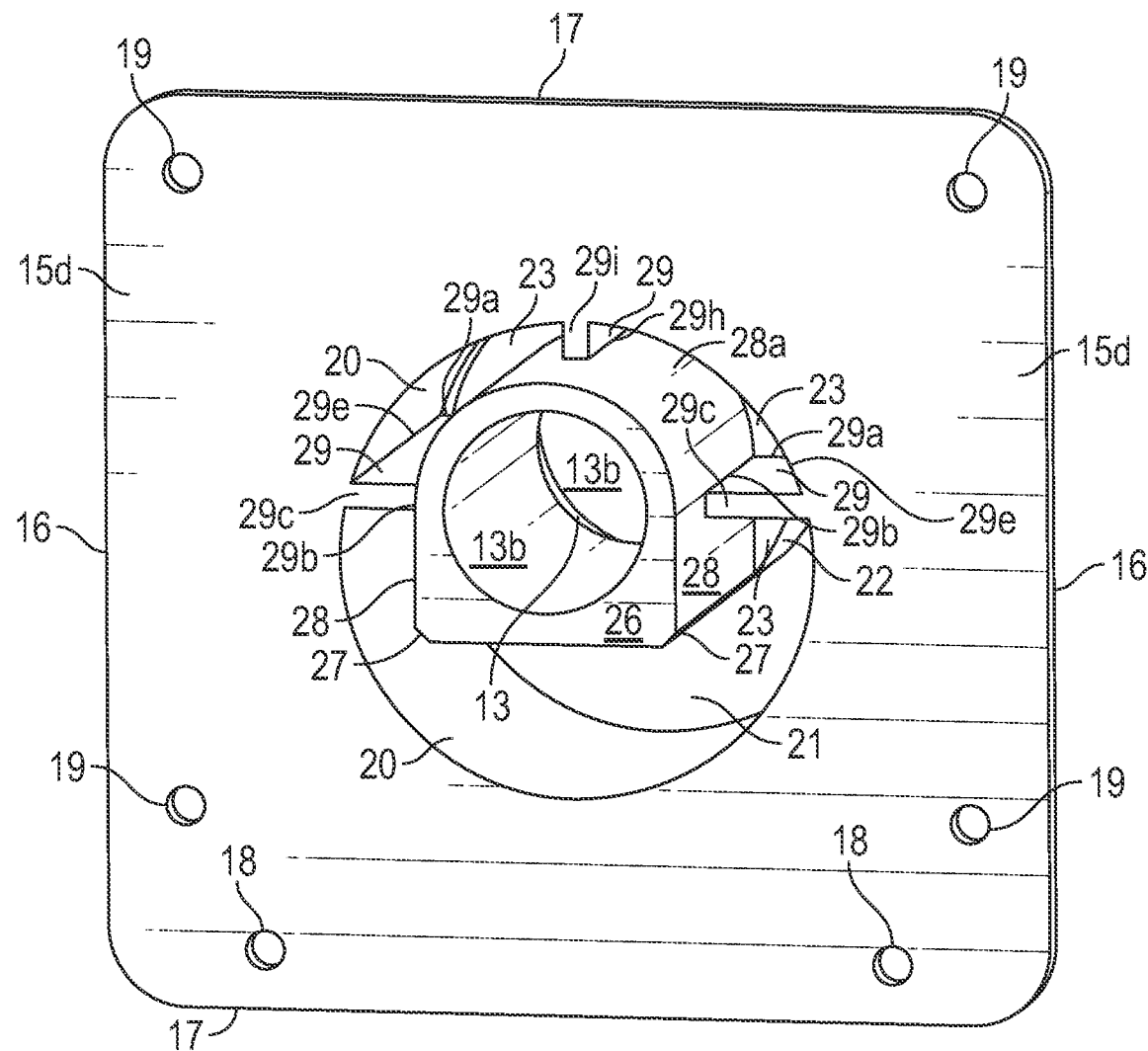
FIG. 4 illustrates an inverted rear isometric view of FIG. 3 according to the present invention.
Figure 6:
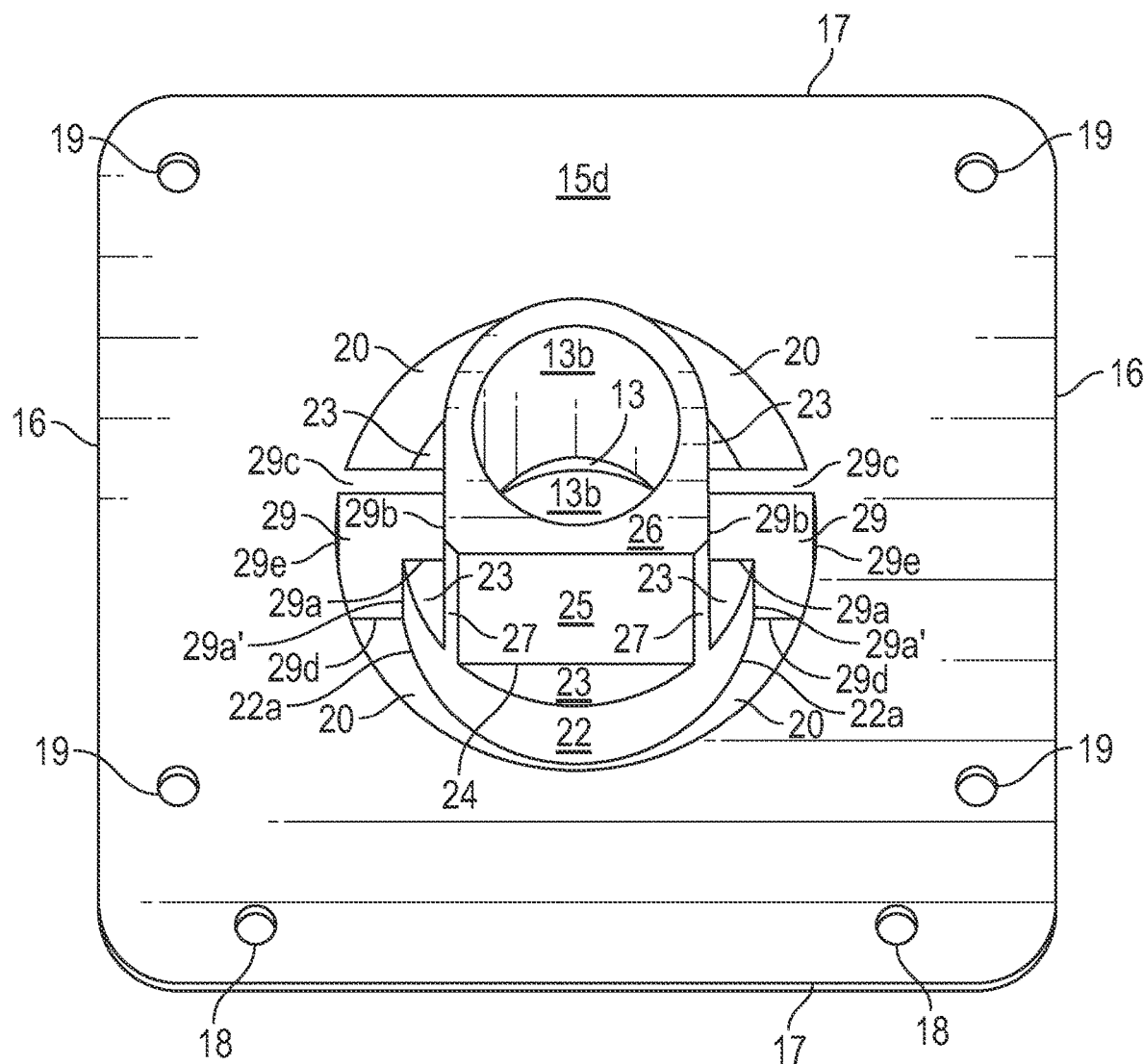
FIG. 6 illustrates an inverted rear isometric view of FIG. 4 of the first embodiment at an upward tilted angle according to the present invention.

FIG. 4 is an inverted isometric view of FIG. 3 that is shown to give a better view of the second outer elongated side edge 29e that is integrally attached along the inner cylindrical side wall surface of the inner cylindrical rear cavity 20, and to the inner cylindrical rear cavity wall surface 21 by 29d (see FIG. 6). Also, the bottom support 29 shows the bottom portion 28a of the second diameter section 24 of the integral being elevated and spaced away from the bottom portion of the inner cylindrical rear cavity 20. Note that the other reference numerals will not be discussed to eliminate redundancy, since they have been discussed in great detail in FIG. 3 above.

Figure 5:
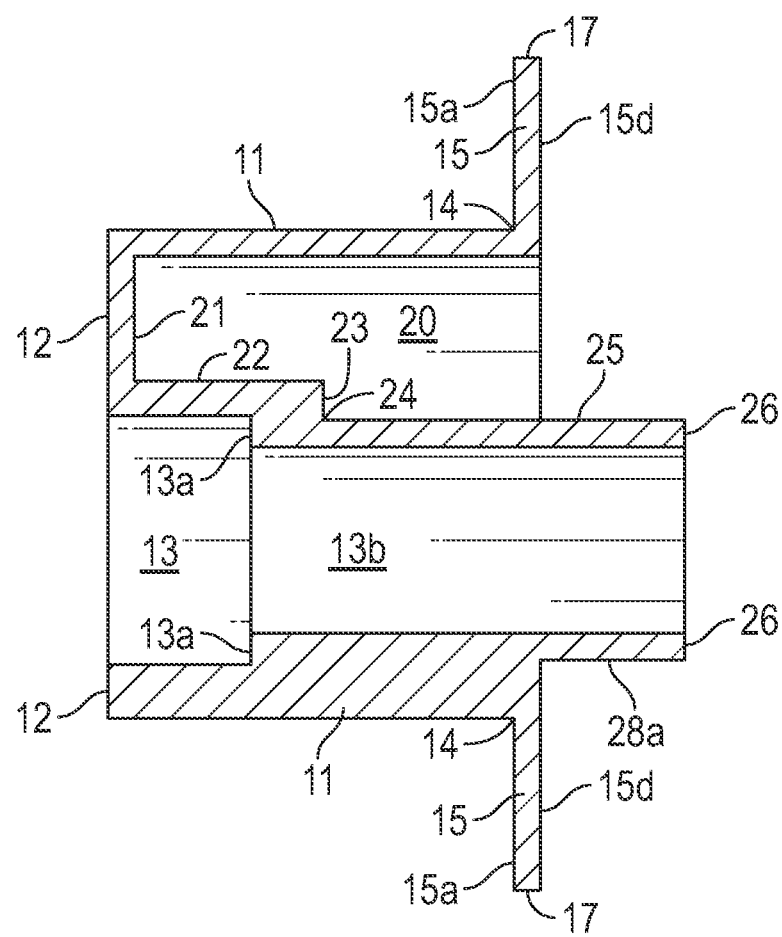
FIG. 5 illustrates a cross-sectional side view of FIG. 2 according to the present invention.

Note that FIG. 5 is a cross-sectional side view of FIG. 2 that shows the new and improved molded one-piece or unitary stub out and rough-in plumbing valve cylinder assembly 10 including the cylindrical member 11 having a front cylindrical face 12 with a front inner off-set cavity 13 of a certain depth disposed therein, which extends to an inner cylindrical wall member 13a forming an off-set conduit opening defining an integral conduit member 13b that extends therefrom and into the integral inner cylindrical rear cavity 20. The cylindrical member 11 having the end 14 that is integrally attached to an integral stub out wall mounting plate 15 having the front face 15a, the rear face 15d, and the top and bottom ends 17. Also, the integral conduit member 13b shows the first cylindrical diameter section 22 integrally attached to the inner cylindrical rear wall surface 21 of the integral rear cylindrical cavity 20. Further, this cross-sectional shows the second diameter section 24 integrally attached to the inner rear cylindrical face 23 of the first cylindrical diameter section 22 that extends to the selective distance beyond the open end of the stub out wall mounting plate 15 that terminates at the rear end face 26. Moreover, the second diameter section 24 shows the top flat portion 25 that extends from the inner rear cylindrical face 23 of the first cylindrical diameter section 22 to the selective distance beyond the open end of the stub out wall mounting plate 15 to the rear end face 26. The bottom portion of the second diameter section 24 is represented by 28.

FIG. 6 is an inverted isometric view of FIG. 4 that is shown at a greater upward angle to give a better view of the second outer elongated side edge 29e of the plurality of support members 29 disposed on opposite sides of the second diameter section 24 that is integrally attached along the inner cylindrical side wall surface of the inner cylindrical rear cavity 20, and to the inner cylindrical rear cavity wall surface 21 by 29d. Note that the other reference numerals will not be discussed to eliminate redundancy, since they have been discussed in great detail in FIG. 3 above.

Figure 7:
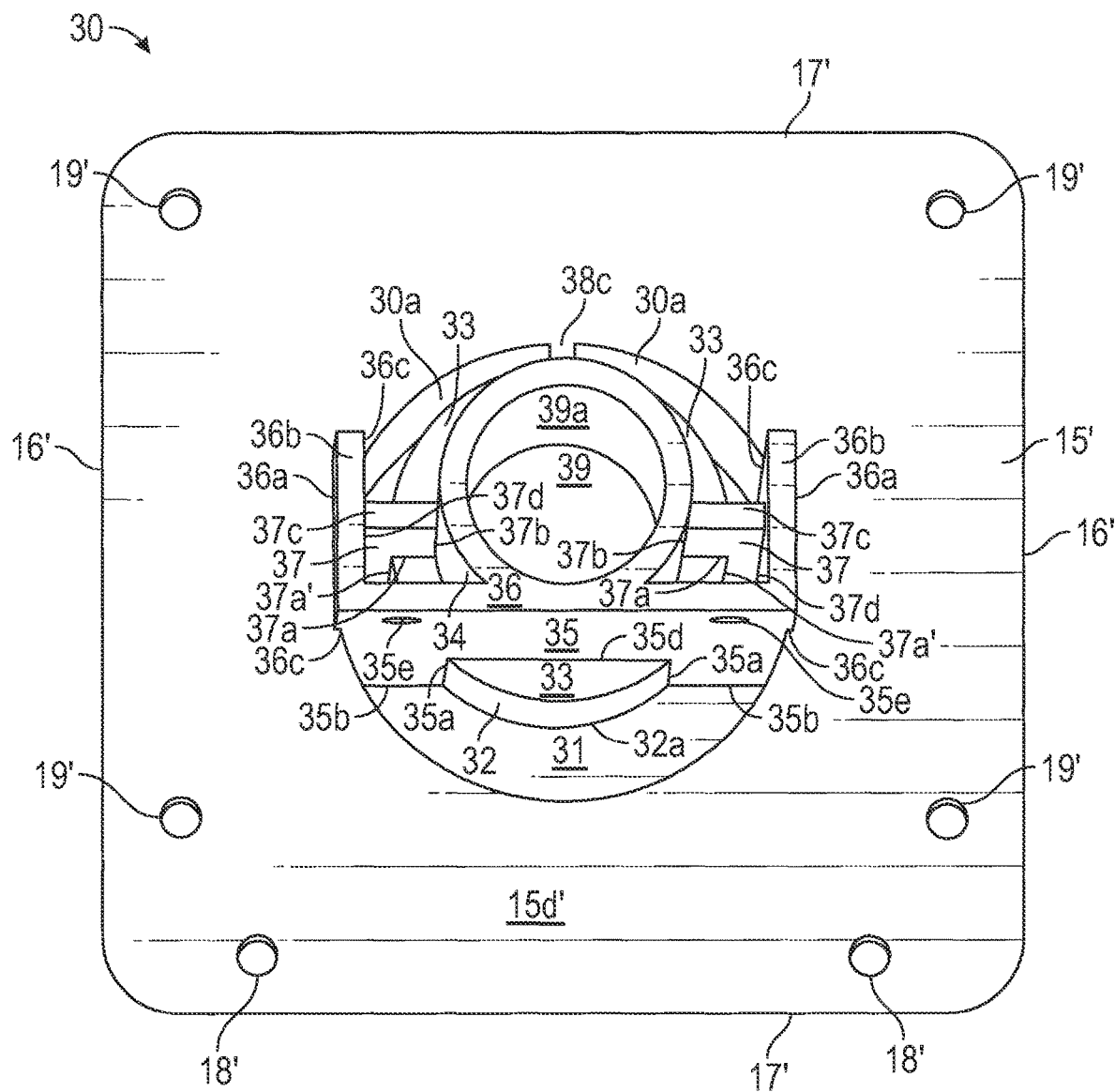
FIG. 7 illustrates an isometric view of a second embodiment of the unitary stub-out and rough-in plumbing valve cylinder having an integral stub out mounting plate with an integral cavity having an internal conduit extending therefrom to a selective distance beyond the integral stub out mounting plate defining support and leveling flange members thereon according to the present invention.
Figure 8:
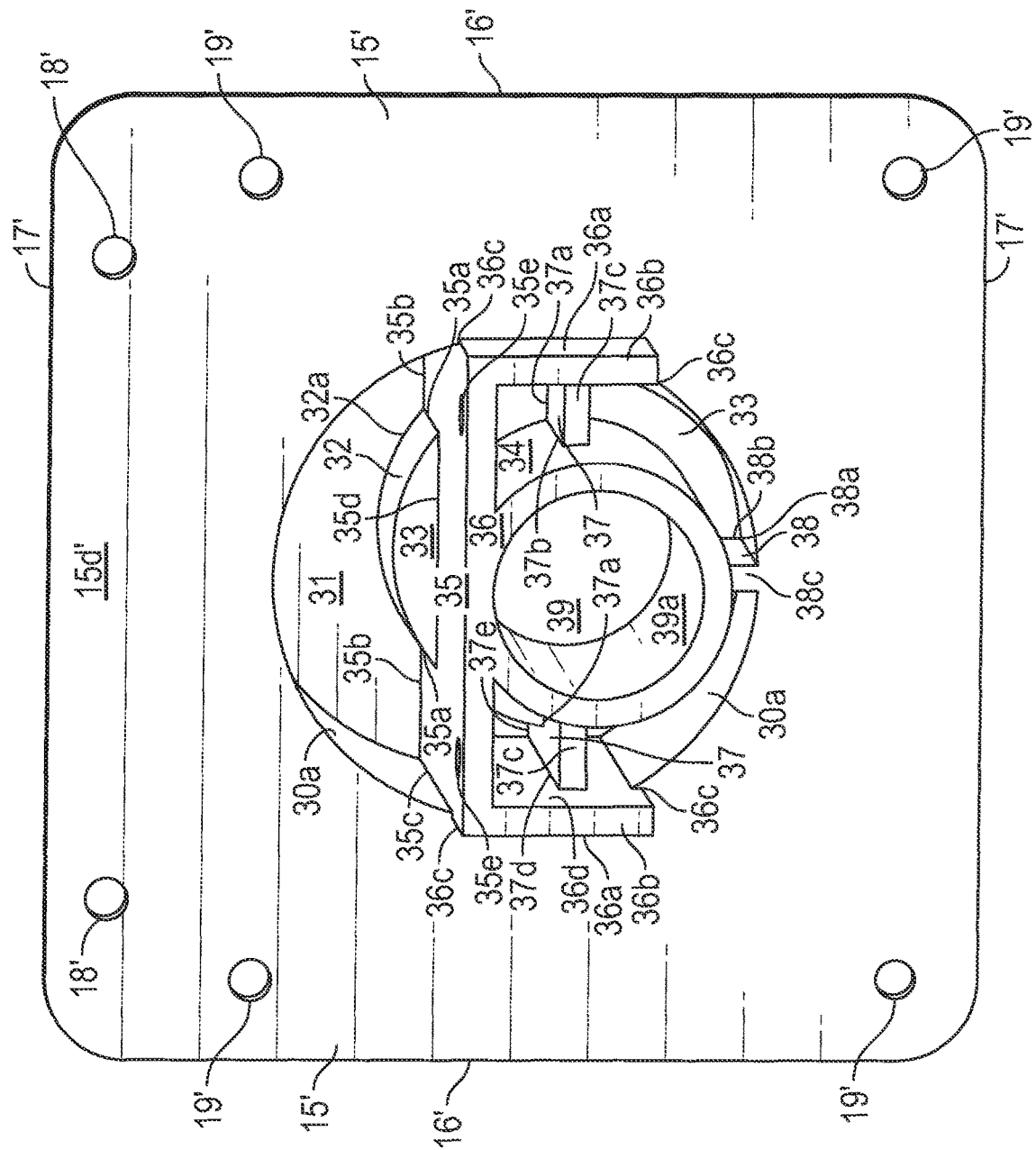
FIG. 8 illustrates an inverted rear perspective view of the second embodiment of FIG. 7 at an upward tilted angle according to the present invention.

A second embodiment of the new and improved molded one-piece or unitary stub out and rough-in plumbing valve cylinder assembly 30 is shown as an inverted rear end view in FIG. 7, which is basically the same as the upright isometric rear end view of FIG. 8. With this being said FIG. 8 will be discussed first. Note that the front end reference numerals of the new and improved molded one-piece or unitary stub out and rough-in plumbing valve cylinder assembly 30 will be represented a prime (') symbol (see FIG. 9), which is basically the same as FIG. 2. In FIG. 8, the new and improved molded one-piece or unitary stub out and rough-in plumbing valve cylinder assembly 30 with the rear self-leveling feature of the integral conduit member 39a defined by a first cylindrical diameter section 32 and a second diameter section 34. The second diameter section 34 is disposed slightly inward of the outer circumference of the first cylindrical diameter section 32, and extending through the integral rear cylindrical cavity 30a to a selective distance beyond an open end of the integral stub out wall mounting plate 15'. The second diameter section 34 has a cylindrical or tubular shape.

Moreover, the second diameter section 34 comprises a top flat portion 35 defining a first self-leveling member that extends from the inner cylindrical rear cavity wall surface 31 of the integral rear cylindrical cavity 30a, and across the inner rear cylindrical face 33 near a top portion of the first cylindrical diameter section 32 to the selective distance beyond the open end of the stub out wall mounting plate 15' that terminates in a rear end face 36. The top flat portion 35 includes a pair of inner edge members 35a that extends along opposite sides of the first cylindrical diameter section 32 at the top portion thereof, an intermediate edge member 35d of the top flat portion 35 is connected integrally across the inner rear cylindrical face 33 with the entire top flat portion 35 extending outward to the pair of flange edge members 35c at opposite ends thereof. Moreover, the pair of flange edge members 35c at opposite ends of the top flat portion 35 is integrally connected to a top end of a pair of downward extending flat side leg portions 36a on opposite sides of the first cylindrical diameter section 32 and the second diameter section 34 and spaced there from. The pair of downward extending flat side leg portions 36a includes a pair of downward extending flat rear leg portions 36b, a pair of downward extending intermediate flat rear leg portions 36c, and a pair of downward extending front leg portions 36e are integrally attached to one another. Also, the rear end face 36 of the top flat portion 35 is integrally attached to the pair of downward extending intermediate rear leg portions 36c, and the pair of downward extending intermediate flat rear leg portions 36c are disposed and spaced inward from the pair of downward extending flat rear leg portions 36b is integrally attached to the rear end face 15d' of the stub out wall mounting plate 15'. The pair of downward extending flat side leg portions 36a defines a second self-leveling member. Further, the flange edge members 35c at a front end thereof, and the pair of downward extending front leg portions 36e are integrally attached to the inner cylindrical rear cavity wall surface 31 by an interconnection with the front end faces 35b of the top flat portion 35. Also, the pair of downward extending flat side leg portions 36a are integrally attached along a portion of the integral rear cylindrical cavity 30a to the pair of downward extending intermediate rear leg portions 36c that is integrally attached the rear end face 15d' of the stub out wall mounting plate 15'.

Further, the top flat portion 35 that is integrally attached to the first cylindrical diameter section 32 and the second diameter section 34 as described above extends to the selective distance beyond the open end of the stub out wall mounting plate 15' defined by the rear end face 36c of the top flat portion 35 that forms the end of the integral conduit 39a, and the pair of downward extending intermediate flat rear leg portions 36c. The integral conduit member 39a is formed through the first cylindrical diameter section 32 and the second diameter section 34. Also, the first cylindrical diameter section 32 having a front end 32a integrally attached to the inner cylindrical rear wall surface 31 of the integral rear cylindrical cavity 20 disposed on an opposite side of the front cylindrical face 12' of the cylinder member 11' (see FIG. 9). The first cylindrical diameter section 32 is defined by the inner cylindrical wall member 13a' of the front inner off-set cavity 39 that extends therefrom and into the integral rear cylindrical cavity 30a, which extends through the inner cylindrical rear wall surface 31 to a selected distance within the integral rear cylindrical cavity 30a, and terminating into the inner rear cylindrical face 33. The first cylindrical diameter section 32 and the second diameter section 34 of the integral conduit member 39a forms an integral passageway therethrough for receiving stub out water lines therein.

Also, the first cylindrical diameter section 32 and the second diameter section 34 of the integral conduit member 39a includes a plurality of support members 37 disposed along at least a portion thereon. In addition, the plurality of support members 37 are disposed within the inner cylindrical rear cavity 30a for rigidly supporting the integral conduit member 39a, the first cylindrical diameter section 32, and the second diameter section 34 herein. The plurality of support members 37 includes a pair of the plurality of support members 37 including a first inner elongated side edge 37a, 37a' and 37b including a first straight edge 37a', an intermediate edge 37a, a second straight edge 37b, and a second outer elongated side edge 37d. Further, the first inner elongated side edge 37a, 37a' and 37b and the second outer elongated side edge 37d are integrally joined together at a front end thereof by a first front edge 37e and at a rear end by a second rear edge 37c that form unitary support members 37 on opposite sides of the first cylindrical diameter section 32 and the integrally attached second diameter section 34 of the integral conduit member 39b. The first straight edge 37a' of the pair of the plurality of support members 37 are integrally attached along the sides of the first cylindrical diameter section 32, the intermediate edge 37a is integrally attached across a central portion of the inner rear cylindrical face 33 of the first cylindrical diameter section 32 contiguous to the outer periphery of the first cylindrical diameter section 32, the second straight edge 37b is integrally attached along the sides of the second diameter section 34 on opposite sides thereof. Next, each one of the second elongated side edges 37d of the pair of the plurality of support members 37 are spaced apart from each one of the first elongated side edges 37a, 37a' and 37b of the pair of the plurality of support members 37 by being integrally joined together at the front end by the first front edge 37e and at the rear end by the second rear edge 37c. The first front edge 37e is integrally attached to the inner cylindrical rear cavity wall surface 31 on opposite sides of the first cylindrical diameter section 32, and each one of the second elongated side edges 37d is integrally attached along an inner flat surface 36d of the downward extending flat side leg portions 36a extending to the open end of the integral stub out wall mounting plate 15' that terminates at the second rear edge 37c. Note that the top flat portion 35 with the pair of flange edge members 35c at opposite ends thereof, which are integrally attached to the pairs of downward extending leg portions 36a, 36b and 36c are formed as an integral and unitary U-shaped member that defines the first and second self-leveling members. A lower integral support member 38 having a bottom elongated edge 38a integrally attached to the bottom of the inner cylindrical rear cavity 30a, a front vertical edge 38b integrally attached to a bottom central portion of the inner rear cylindrical face 33 of the first cylindrical diameter section 32, a rear vertical edge 38c is integrally attached to a top portion of the second diameter section 34 (not shown) to the inner rear cylindrical face 33 of the first cylindrical diameter section 32, and a top portion of 38c extends from the inner rear cylindrical face 33 of the first cylindrical diameter section 32 to the open end of the integral stub out wall mounting plate 15'. Also, the lower integral support member and the downward extending leg portions 36a, 36b, and 36c are spaced from and support the second diameter section 34 above the bottom inner cylindrical wall surface of the inner rear cylindrical cavity 30a. Further the lower cylindrical portion of the first cylindrical diameter section 32 is integrally attached to a bottom portion of the bottom inner cylindrical wall surface of the inner rear cylindrical cavity 30a. Moreover, these integral support members 37 and 38 will provide a firm support to the stub out water lines within the integral conduit member 39a against movement, sagging, bending and flexing therein.

Note that FIG. 7 is very similar to FIG. 8 as discussed above. Since most of the reference numerals are the same, they will not be discussed in order to obviate redundancy. FIG. 7 is an inverted orientation of FIG. 8, that clearly shows the first elongated side edges 37a, 37a' and 37b of the pair of the plurality of support members 37 and the inner rear cylindrical face 33 shows a better view than the view as shown in FIG. 8. FIG. 7 and FIG. 8 shows a pair of spaced apart mounting holes 35 in the top flat portion 35 contiguous to the rear end face 36, and spaced from the upper ends of the pair of downward extending flat rear leg side portions 36a, and the pair of downward extending intermediate flat rear leg portions 36c disposed and spaced inward from the pair of downward extending flat rear leg portions 36b. Note that the pair of spaced apart mounting holes 35e in the top flat portion 35 are optional in mounting the molded one-piece or unitary stub out and rough-in plumbing valve cylinder assembly 30 to a horizontal wall framed stud member 44 as shown in FIG. 10 in addition to the upper mounting holes 18' and 19' shown in FIG. 7 and FIG. 8.

Figure 9:
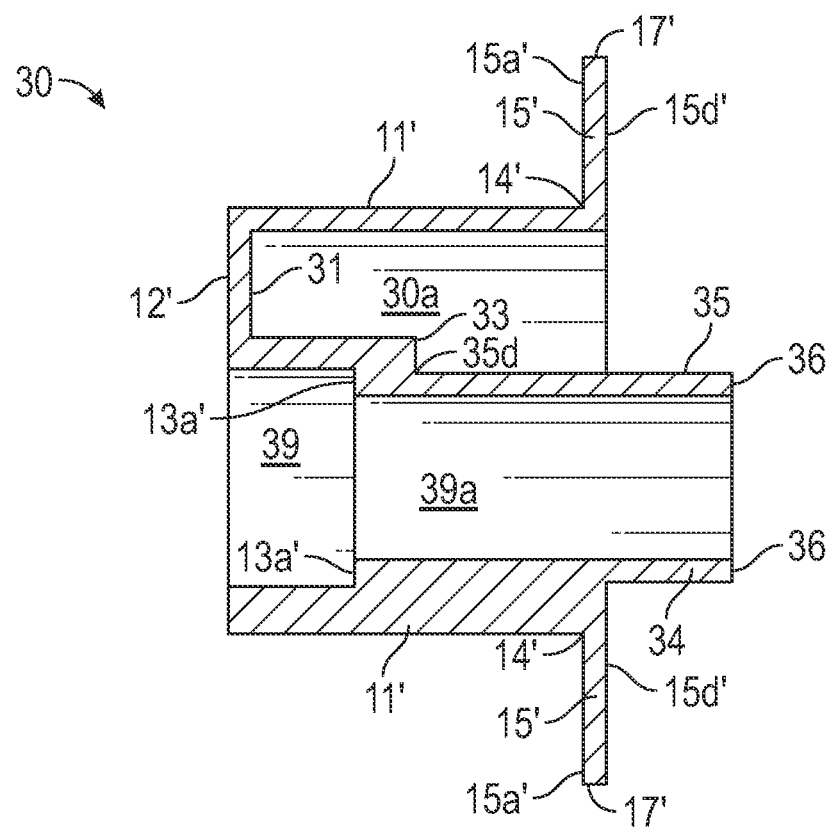
FIG. 9 illustrates a cross-sectional side view of FIG. 7 according to the present invention.

Note that FIG. 9 is a cross-sectional side view of FIGS. 2, 7, and 8 that shows the new and improved molded one-piece or unitary stub out and rough-in plumbing valve cylinder assembly 30 including the cylindrical member 11' having a front cylindrical face 12' with a front inner off-set cavity 39 of a certain depth disposed therein, which extends to an inner cylindrical wall member 13a' forming an off-set conduit opening defining an integral conduit member 39a that extends therefrom and into the integral inner cylindrical rear cavity 30a. The cylindrical member 11' having an end 14' integrally attached to an integral stub out wall mounting plate 15' having the front face 15a', the rear face 15d', and the top and bottom ends 17'. Also, the integral conduit member 39a extends through the first cylindrical diameter section 32 that is integrally attached to an inner cylindrical rear wall surface 31 of the integral rear cylindrical cavity 30a. Further, this cross-sectional side view of FIG. 9 shows the integral conduit member 39a continuing to extend through the second diameter section 34 to the rear end face 36, wherein the second diameter section 34 is integrally attached to the inner rear cylindrical face 33 of the first cylindrical diameter section 32, and extends to the selective distance beyond the open end of the stub out wall mounting plate 15' that terminates at the rear end face 36. Moreover, the second diameter section 34 shows the top flat portion 35 extending from the inner rear cylindrical face 33 of the first cylindrical diameter section 32 to the selective distance beyond the open end of the stub out wall mounting plate 15' to the rear end face 36. Note that FIG. 9 is very similar to FIG. 5

Figure 10:
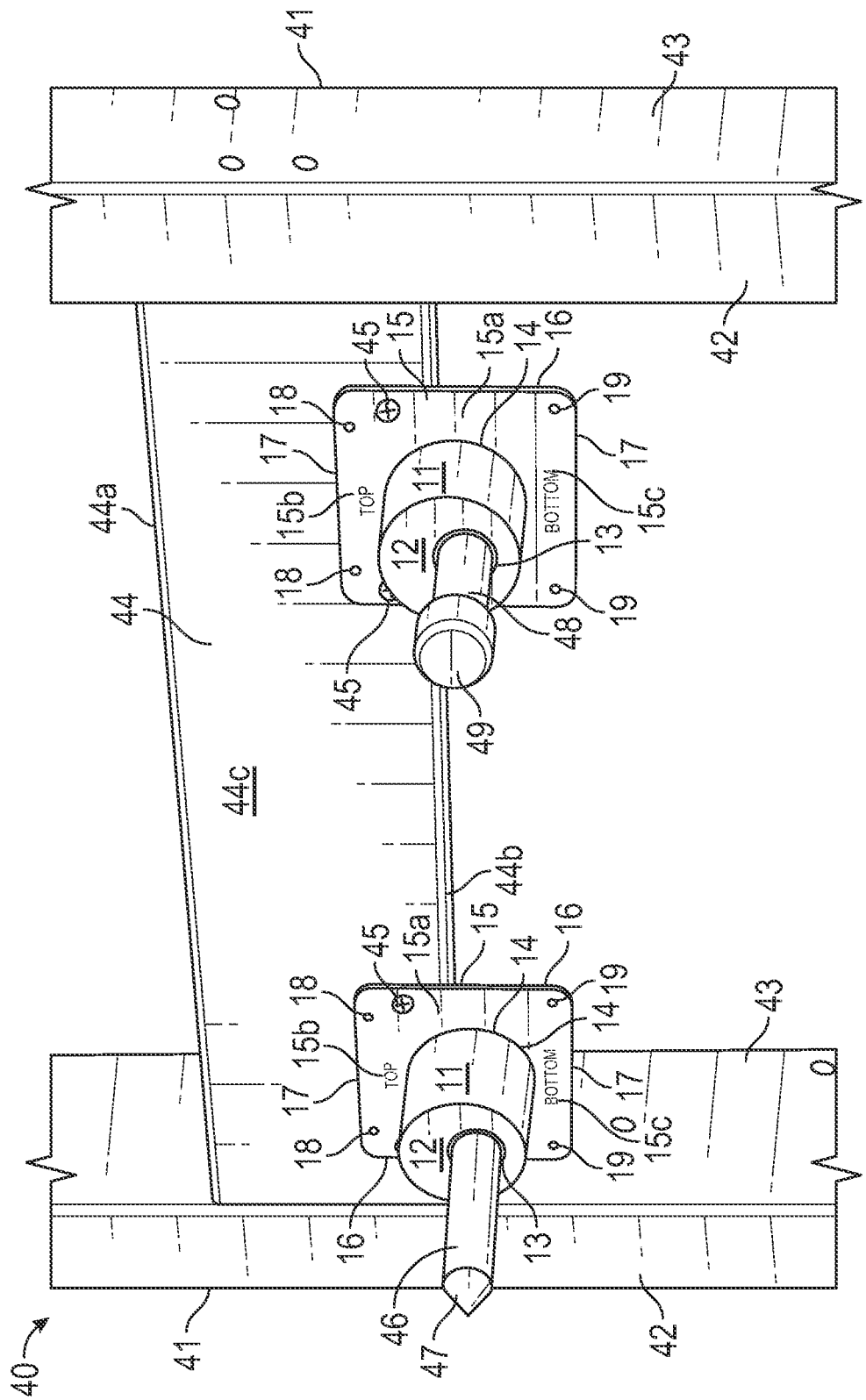
FIG. 10 illustrates an isometric view of the first embodiment having a pair of the unitary stub-out and rough-in plumbing valve cylinders with each having an integral stub out mounting plate with an internal cavity having a conduit extending therefrom that receives a water line there through and mounted to a horizontal wall stud according to the present invention.

FIG. 10 teaches a pair of the new and improved molded one-piece or unitary stub out and rough-in plumbing valve cylinder assembly 10 as shown in FIG. 2 that is mounted to a wall framed stud assembly 40 by a plumber or user during a rough-in stage. The wall framed stud assembly 40 includes a horizontal wall framed stud member 44 that is disposed between a pair of vertical wall framed stud members 41 including an outer side face 43, a front end face 42, a rear end face 42a, and an inner side face 43. The horizontal wall framed stud member 44 includes a top end surface 44a, a bottom end surface 44b, and a front surface 44c. As shown in FIG. 10, the horizontal wall framed stud member 44 is attached to the inner side face 43 of the pair of vertical wall framed stud members 41. Details of the new and improved molded one-piece or unitary stub out and rough-in plumbing valve cylinder assembly 10 as shown in FIGS. 1-5 has been fully described above and most of the reference numerals description will not be repeated again here. FIG. 10 shows the primary benefit of the present invention, that is, mounting a pair of the new and improved molded one-piece or unitary stub out and rough-in plumbing valve cylinder assembly 10 as a unit during the rough-in phase. During the rough-in phase, a plumber or user can mount a pair of integral conduit members 13b of the pair of the new and improved molded one-piece or unitary stub out and rough-in plumbing valve cylinder assembly 10 in selectively spaced apart locations on the front surface 44c of the horizontal wall framed stud member 44 by a screw or nail 45 inserted via the top pair of mounting holes 19. As illustrated a plumber or user inserts a copper pipe 46 with a capped end 47 through an integral conduit member 13b and out through an integral front cavity 13 to a selective distance extending beyond cavity 13 of one of the pair of the new and improved molded one-piece or unitary stub out and rough-in plumbing valve cylinder assembly 10, and a plumber or user inserts a plastic type of pipe 48 with a capped end 49 is inserted through an integral front cavity 13 with the capped end extending a selective distance there from and out through an integral conduit member 13b at a selective distance beyond the open end of the integral stub out wall mounting plate 15 of the other one of the pair of the new and improved molded one-piece or unitary stub out and rough-in plumbing valve cylinder assembly 10 during the rough-in phase. Also, the plastic type of pipe 48 could be open at both ends thereof with both ends extending a selective distance from the integral front cavity 13 and from the integral conduit member 13b at a selective distance beyond the open end of the integral stub out wall mounting plate 15. Thereafter, a cap member 49 can be attached to the open end extending a selective distance from the integral front cavity 13.

Figure 11:
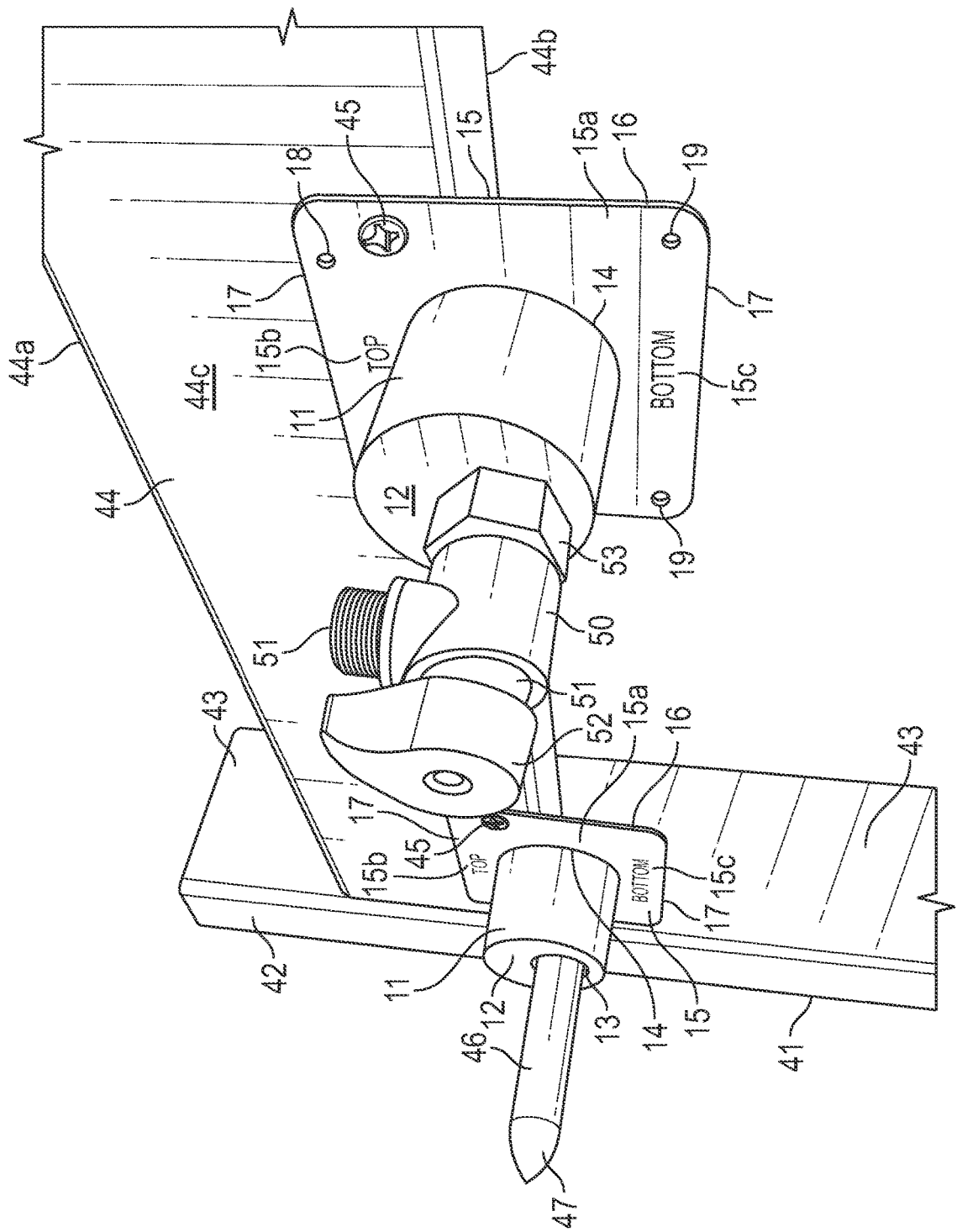
FIG. 11 illustrates an isometric view of FIG. 10 with a quarter-turn water stop valve with an external compression nut that is attached to one of the water lines received there through along the pair of internal conduits and mounted to a horizontal wall stud according to the present invention.

FIG. 11 is the same as FIG. 10 except for adding a water stop valve device, such as, a quarter-turn valve to the plastic type pipe 48. Still during the rough-in phase, the plumber or user will cut or remove the capped end, and attach the water stop valve device, such as, a quarter-turn valve having a valve body housing 50, a valve stem and sealing assembly enclosure 51, a valve handle or actuator 52, a compression nut 53, and a valve outlet 54 thereto. Note that compression nut 53 secures and seals the valve body housing 50 to the plastic type pipe 48 at the inlet end of the valve body housing 50. The compression nut 53 is disposed externally and abuts the front face 12 about the integral front cavity 13 of the cylinder 11 for easy removal of the compression nut 53 for servicing and/or removal of the valve body housing 50. The outlet 54 is connectable to the inlet of water fixture type devices.

Figure 12:
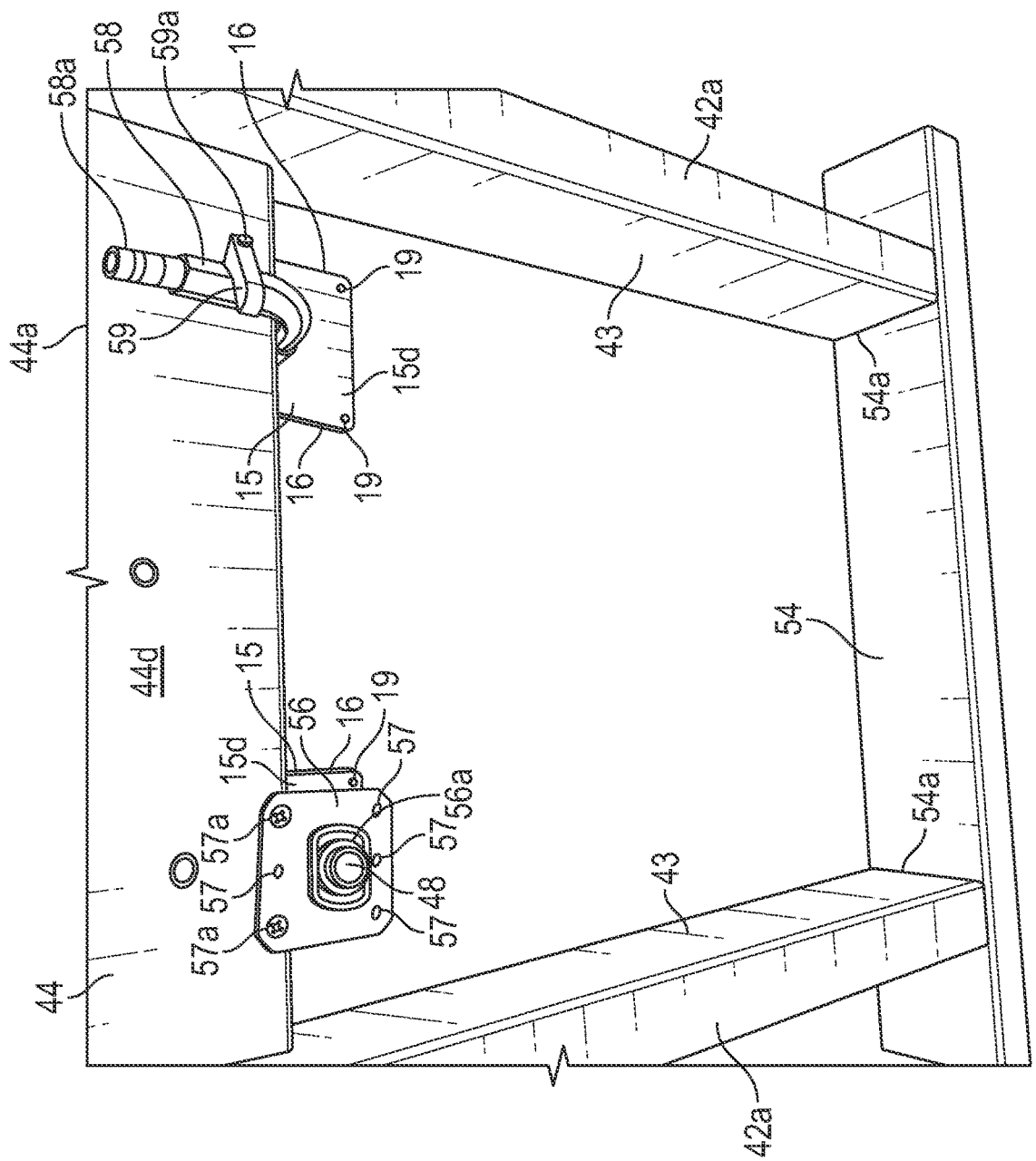
FIG. 12 illustrates a rear perspective view of FIG. 10 with different types of rear mounting clamp members secured to the rear side of the horizontal wall stud according to the present invention.

Note that FIG. 12 is the back side mounting of the wall framed stud assembly 40 as described in the above FIGS. 10-11. The back side of the wall framed stud assembly 40 includes a back surface 44d, the top end surface 44a, the bottom end surface 44b, the pair of vertical wall framed stud members including the rear end faces 42a, and the inner side faces 43 that the horizontal wall framed stud member 44 is attached there between, the pair of vertical wall framed stud members 41 further includes a bottom end 54a that is attached to a bottom wall framed stud plate 54. After the plumber or user has installed the integral stub out wall mounting plate 15 to the front surface 44c of the horizontal wall framed stud member 44, is ready to install back side mounting plates, brackets, and/or clamps. The copper pipe 46 with the capped end 47 on a front side of the horizontal wall framed stud member 44 as discussed above includes a rear bend portion 58 with an upper end 58a for connecting to a water supply line. Now, the plumber or user can secure and stabilize the rear bend portion 58 of the copper pipe 46 with a clamp member 59 that is secured to the back surface 44d of the horizontal wall framed stud member 44 by a screw or nail 59a. Next, the plumber or user is ready to secure the plastic type pipe 48 with the attached water stop valve device, such as the quarter-turn valve 50, after the plumber or user has installed the plastic type pipe 48 to the front surface 44c of the horizontal wall framed stud member 44. Once this is done, the plumber or user is ready to install the stud wall mounting plate 56 to the back surface 44d of the horizontal wall framed stud member 44 by inserting a screw or nail 57a through a plurality of mounting holes 57 into the stud wall mounting plate 56 for receiving and stabilizing the plastic type pipe 48. Further, an inlet end of the plastic type pipe 48 is received through a sealed opening 56a in the bracket 56. Then a "L" fitting can be attached to the plastic type pipe 48 in order to receive a water supply line. All of this installation is still being done during the rough-in phase. The back side of the integral stub out wall mounting plate 15 shows reference numerals 15d, 16, and 19, which will not be described here, see full details of these reference numerals as described above.

Figure 13:
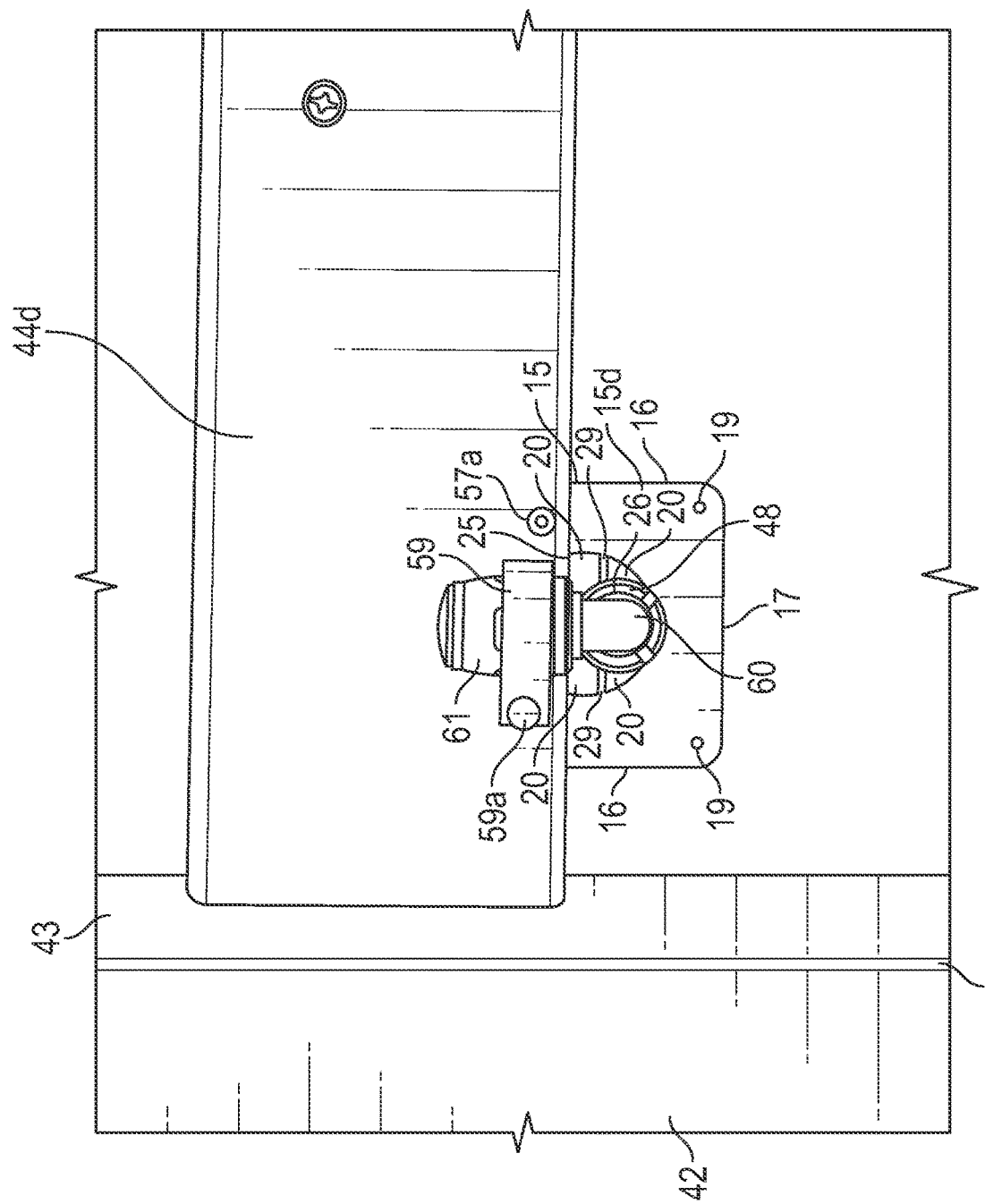
FIG. 13 illustrates a rear perspective view of FIG. 10 with one of the water lines being attached to a L-shaped fitting and mounted to the rear side of the horizontal wall stud by a clamp member according to the present invention.

FIG. 13 shows a different mounting member for the plastic type pipe 48 that is connected to an L-shaped fitting. In FIG. 13, the integral stub out wall mounting plate 15 has been mounted to the front surface 44c of the horizontal wall framed stud member 44 by the attaching screw or nail member 45 or 57a as shown. The back side of the integral stub out wall mounting plate 15 shows the integral inner cylindrical rear cavity 20, the unitary support members 29 on opposite sides of the first cylindrical diameter section 22 and the integrally attached second diameter section 24 of the integral conduit member 13b, and the plastic type pipe 48 that is coupled to an "L" shaped fitting 60 with an upper portion 61 to be connected to a water supply line. Moreover, the top flat portion 25 of the first embodiment of the new and improved molded one-piece or unitary stub out and rough-in plumbing valve cylinder assembly 10 is disposed underneath the bottom end surface 44b of the horizontal wall framed stud member 44 for leveling the new and improved molded one-piece or unitary stub out and rough-in plumbing valve cylinder assembly 10 relative to the bottom end surface 44b of the horizontal wall framed stud member 44. The upper end portion 61 of the "L" shaped fitting 60 is secured to the back surface 44d of the horizontal wall framed stud member 44 by a clamp member 59 with a screw or nail 59a. The back side of the integral stub out wall mounting plate 15 shows reference numerals 15*d*, 16, 17, and 19, which will not be described here, see full details of these reference numerals as described above. The above installation is still a part of the rough-in phase.

Figure 14:
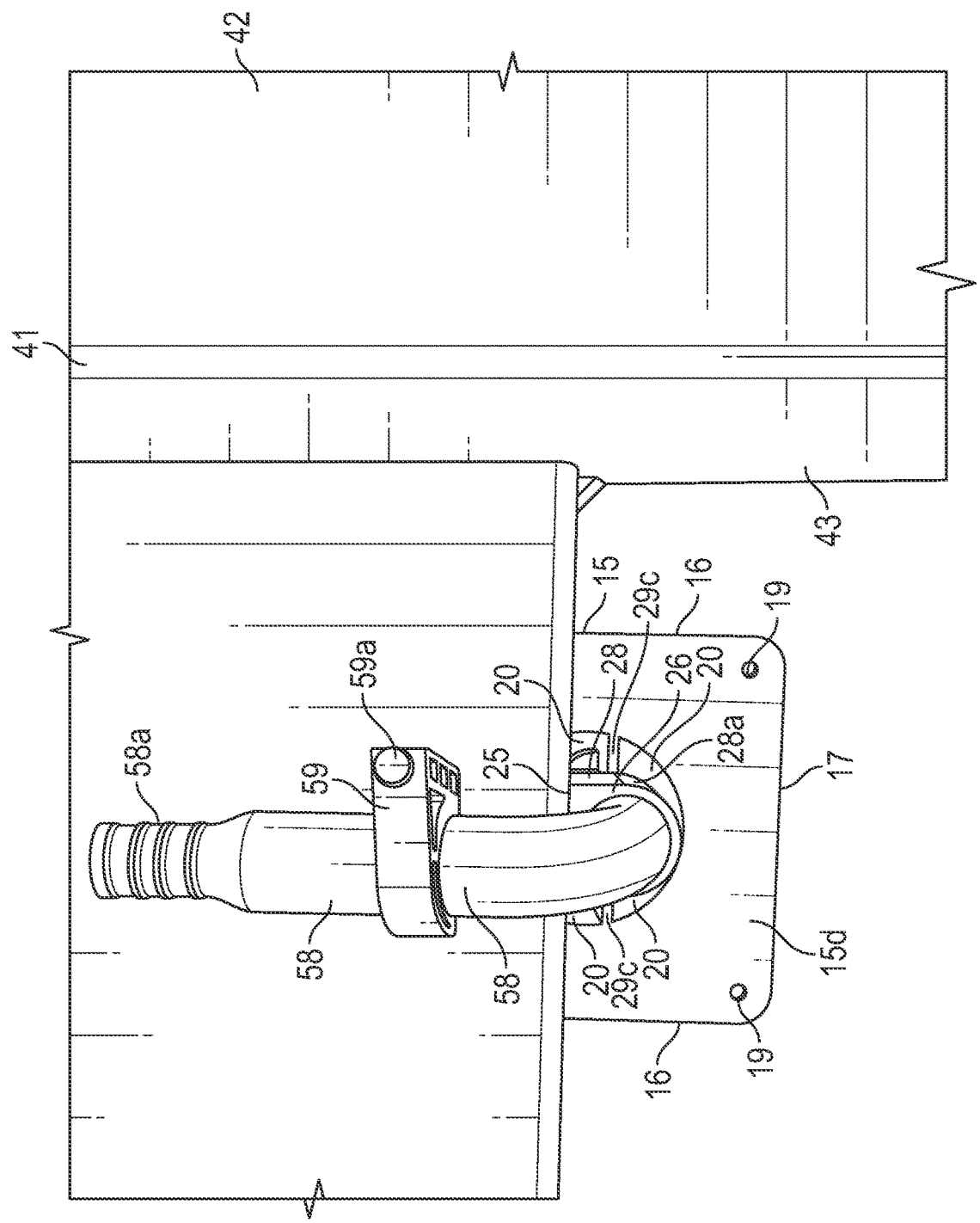
FIG. 14 illustrates a rear perspective view of FIG. 10 with a copper water line being secured to the horizontal wall stud by a clamp member with a first type of support and leveling flange member of the rear conduit supported underneath the horizontal wall stud according to the present invention.

FIG. 14 shows a partial isometric view of the self-leveling feature of the new and improved molded one-piece or unitary stub out and rough-in plumbing valve cylinder assembly 10. The top flat portion 25 of the first embodiment of the new and improved molded one-piece or unitary stub out and rough-in plumbing valve cylinder assembly 10 is disposed underneath the bottom end surface 44*b* of the horizontal wall framed stud member 44 for leveling the new and improved molded one-piece or unitary stub out and rough-in plumbing valve cylinder assembly 10 relative to the bottom end surface 44*b* of the horizontal wall framed stud member 44. The copper pipe 46 having a rear bend portion 58 with an upper end 58*a* for connecting to a water supply line. Further, a plumber or user can secure and stabilize the rear bend portion 58 of the copper tubing 46 with a clamp member 59 that is secured to the back surface 44*d* of the horizontal wall framed stud member 44 by a screw or nail 59*a*. The back side of the integral stub out wall mounting plate 15 shows the top flat portion 25 for leveling the new and improved molded one-piece or unitary stub out and rough-in plumbing valve cylinder assembly 10 relative to the bottom end surface 44*b* of the horizontal wall framed stud member 44. Also, the rear end of the top flat portion 25 shows the rear end face 26 that defines the selective distance of the member 13*b* beyond the open end of the integral stub out mounting plate 15. Note that reference numerals 15*d*, 16, 17, 19, 20, 29*c*, 41, 42, and 43 will not be described here, see full details of these reference numerals as previously described above to avoid redundancy. This installation is still a part of the rough-in phase.

Figure 15:
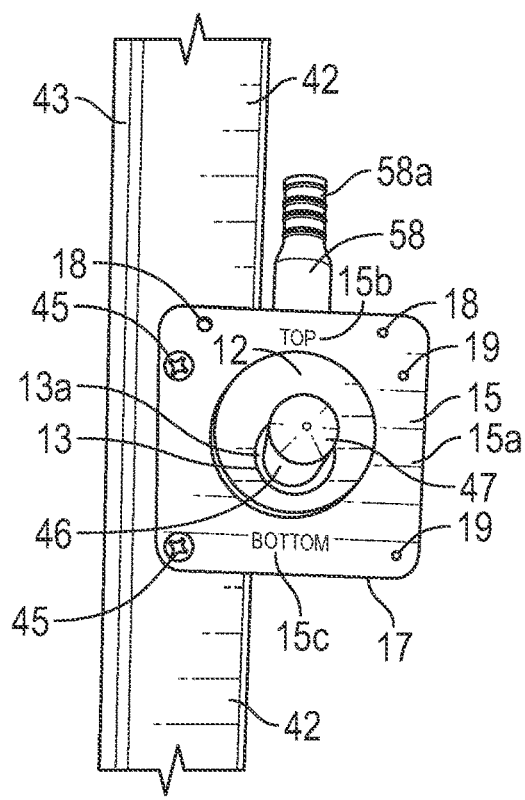
FIG. 15 illustrates a front perspective view of the first embodiment of the unitary stub-out and rough-in plumbing valve cylinder having an integral stub out mounting plate with an internal cavity having a conduit extending therefrom to a selective distance beyond the integral stub out mounting plate that receives a copper water line there through and mounted to a vertical wall stud according to the present invention.

FIG. 15 shows the installation of the new and improved molded one-piece or unitary stub out and rough-in plumbing valve cylinder assembly 10 by a plumber or user who attaches the integral stub out mounting plate 15 to the front end face 42 of the wall framed stud assembly 40 by a pair of the outer peripheral mounting holes 19 of the integral stub out mounting plate 15 by inserting a screw or nail 45 via the pair of mounting holes 19. The copper pipe 46 with the cap end 47 have been inserted through the integral conduit member 13*b* through the inner cylindrical wall member 13*a* that forms the off-set conduit opening defining the integral conduit member 13*b*, and through the inner off-set cavity 13 of a certain depth disposed therein, wherein the copper pipe 46 with the capped end 47 extends to a selective distance beyond the front cylindrical face 12 of the cylinder 11 so that a water stop valve, such as, a quarter-turn valve 50 can be attached to copper pipe 46 after the capped end 47 has been removed or cut off by the plumber or user. Moreover, the front face 15*a* of the integral stub out mounting plate 15 having the top indicia 15*b*, and the bottom indicia 15*c* are used to alert the plumber or user of the correct orientation of the new and improved molded one-piece or unitary stub out and rough-in plumbing valve cylinder assembly 10 before the integral stub out mounting plate 15 is mounted to the front face 42 of the of the wall framed stud assembly 40. In order to avoid redundancy, reference numerals 15*a*, 18, 43, 58, and 58*a* will not be described here, see full details of these reference numerals as previously described above.

Figure 16:
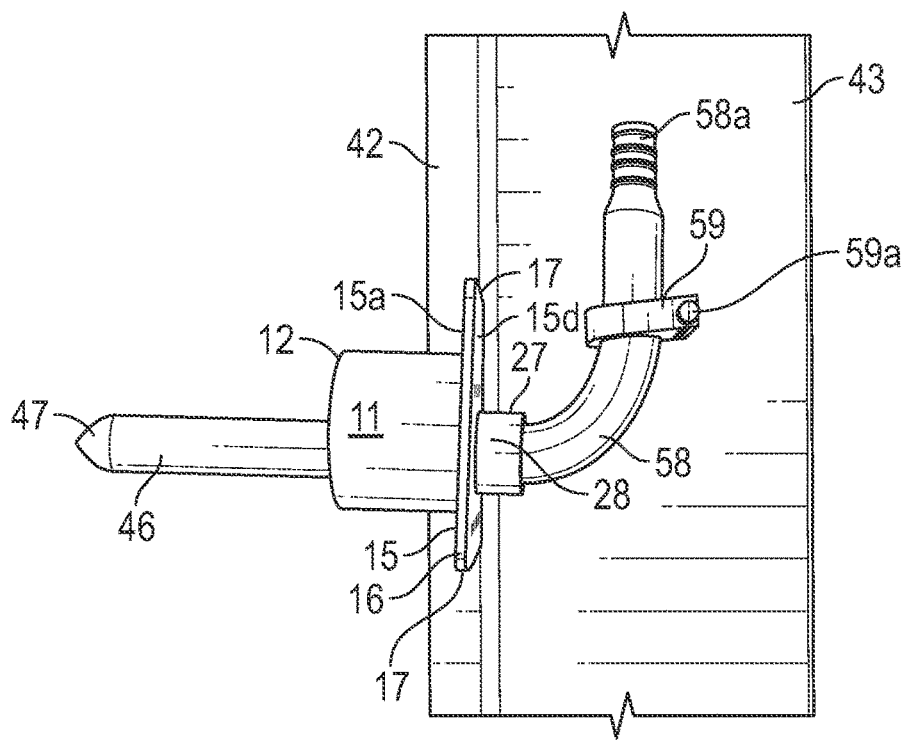
FIG. 16 illustrates a side view of FIG. 15 that shows the conduit that extends beyond the integral stub out mounting plate that defines the first type of support and leveling flange member thereon that engages and is supported against a side portion of a wall stud and a clamp member for securing a copper water line extending through the conduit to the wall stud according to the present invention.

FIG. 16 is a side view of FIG. 15 of the first embodiment that shows the copper pipe 46 with the bend portion 58 being secured to the inner side face 43 of the wall framed stud assembly 40 by the screw or nail 59*a*. The top portion 58*a* of the bend portion of the copper pipe 46 is used to attach a water supply line thereto. Upon a plumber or user attaching the integral stub out mounting plate 15 to the front face 42 of the wall framed stud assembly 40, the flat side portion 28 of the second diameter section 24 against the inner side face 43 of the wall framed stud assembly 40 will level the new and improved molded one-piece or unitary stub out and rough-in plumbing valve cylinder assembly 10 relative to the inner side face 43 of the wall framed stud assembly 40. If the bevel surface 27 positioned above the flat side portion 28 engages against the inner side face 43 of the wall framed stud assembly 40, it will indicate to the plumber or user that the new and improved molded one-piece or unitary stub out and rough-in plumbing valve cylinder assembly 10 is unlevel relative to the inner side face 43 of the wall framed stud assembly 40. Note that reference numerals 11, 12, 15*a*, 15*d*, 16, 17, and 42 will not be described here, see full details of these reference numerals as previously described above to avoid redundancy.

Figure 17:
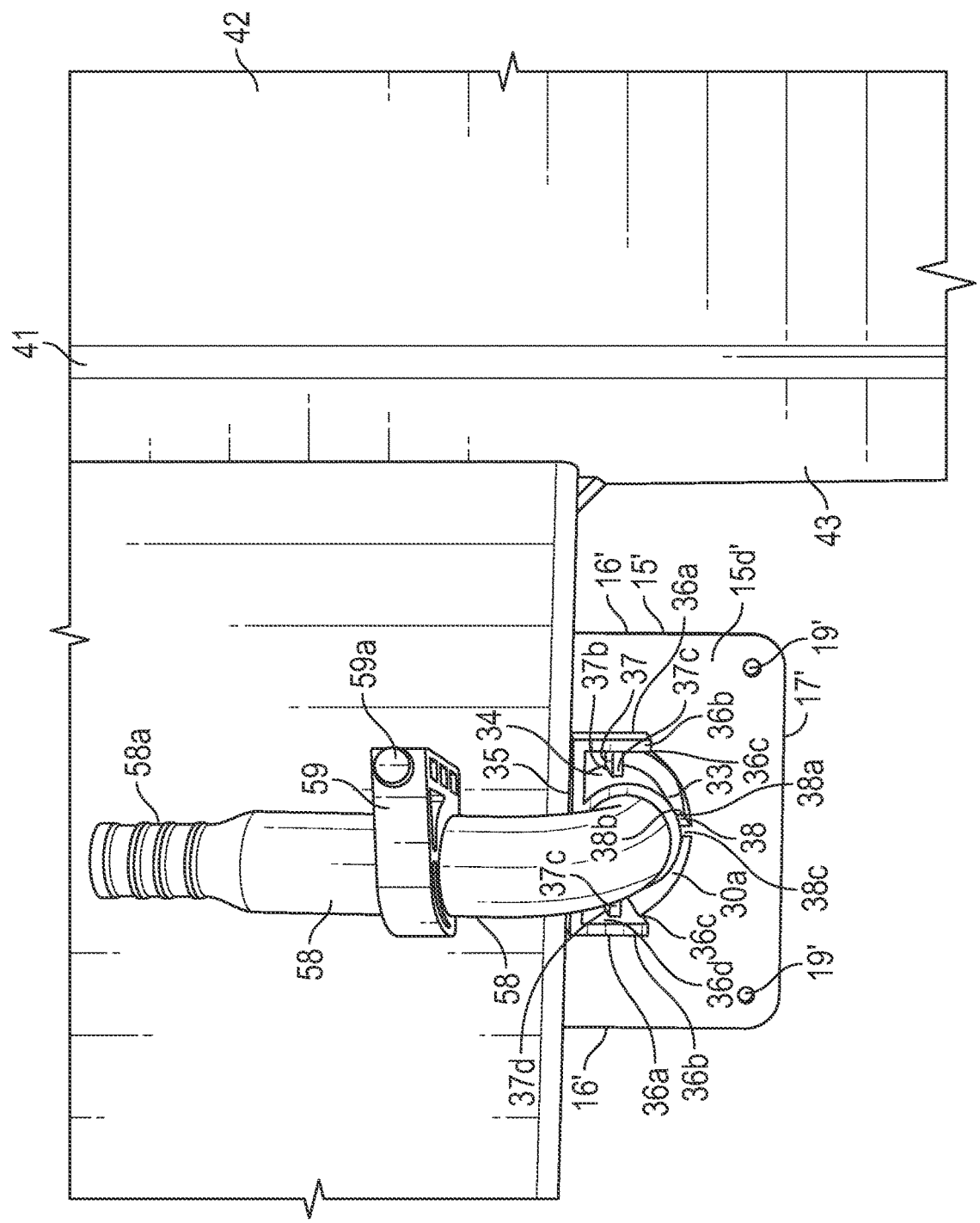
FIG. 17 illustrates a rear perspective view of FIG. 10 with a copper water line being secured to the horizontal wall stud by a clamp member with a second type of support and leveling flange member of the rear conduit supported underneath the horizontal wall stud according to the present invention.

FIG. 17 represents the second embodiment of a rear self-leveling feature. This second embodiment shows the rear face 15*d'*, the pair of opposite side portions 16', and the top and bottom ends 17' of the integral stub out mounting plate 15' is mounted to the front face 44*c* of the horizontal wall framed stud member 44. As shown, the first leveling feature is readable on the top flat portion 35 with downward extending leg portions 36*a*, 36*b*, and 36*c* integrally attached to the second diameter section 34 that is rigidly supported within the inner cylindrical rear cavity 30*a* by a plurality of support members 37, 37 *b*, 37*c*, 38, 38*a* 38*b*, 38*c*. Also, the top flat portion 35 extends across the inner rear cylindrical face 33 of the first cylindrical diameter section 32. The top flat portion 35 is positioned underneath the horizontal wall framed stud member 44 for leveling the new and improved molded one-piece or unitary stub out and rough-in plumbing valve cylinder assembly 30. See FIGS. 7 and 8 for greater details as recited above for the reference numerals discussed above, as well as reference numerals 36*d*, and 37*d*. Moreover, FIG. 17 shows the copper pipe 46 with the bend portion 58 being secured to the inner side face 43 of the wall framed stud assembly 40 by the screw or nail 59*a*. The top portion 58*a* of the bend portion of the copper pipe 46 is used to attach a water supply line thereto. The above work was performed during the rough-in phase.

Figure 18:
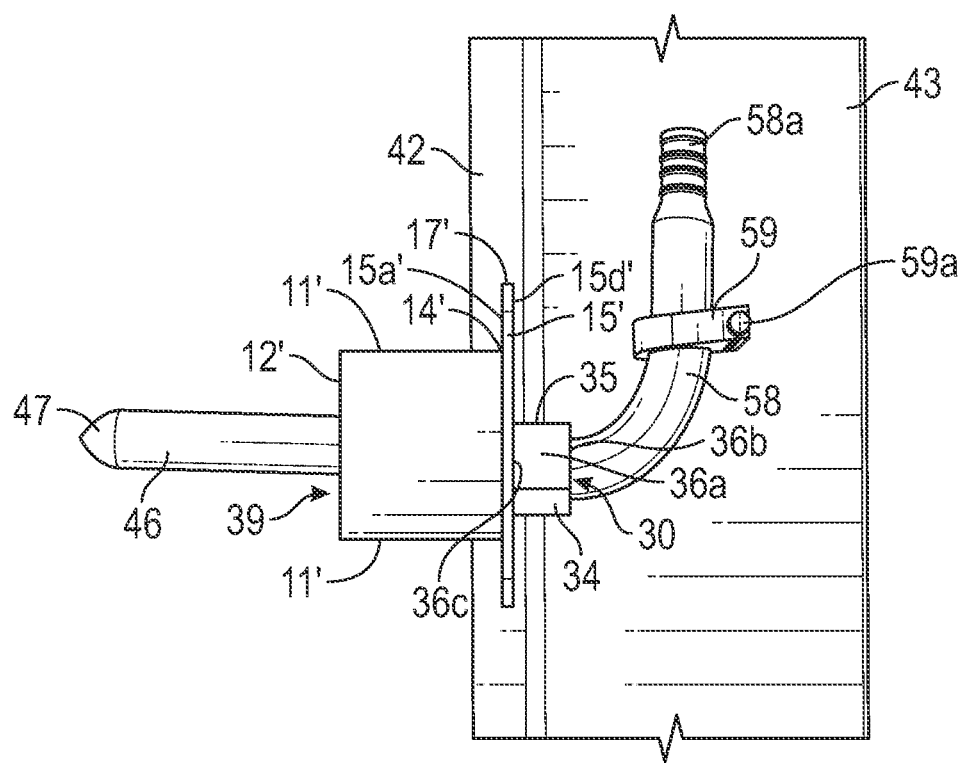
FIG. 18 illustrates a side view of FIG. 15 that shows the conduit that extends beyond the integral mounting plate that defines the second type of support and leveling flange member thereon that engages and is supported against a side portion of a wall stud and a clamp member for securing a copper water line extending through the conduit to the wall stud according to the present invention.

FIG. 18 is a side view of FIG. 17 of the second embodiment that shows the copper pipe 46 with the bend portion 58 being secured to the inner side face 43 of the wall framed stud assembly 40 by the screw or nail 59*a*. The top portion 58*a* of the bend portion of the copper pipe 46 with the capped end 47 is used to attach a water supply line thereto. Upon a plumber or user attaches the integral stub out mounting plate 15' to the front face 42 of the wall framed stud assembly 40. One of the pair of downward extending flat rear leg side portions 36*a* is positioned against the inner side face 43 of the wall framed stud assembly 40, which will level the new and improved molded one-piece or unitary stub out and rough-in plumbing valve cylinder assembly 30 relative to the inner side face 43 of the wall framed stud assembly 40. Note that reference numerals 11', 12', 15*a'*, 15*d'*, 16', 17', 30, 36*b*, 36*c*, 39, and 42 will not be described here, see full details of these reference numerals as previously described above to avoid redundancy.

Figure 19:
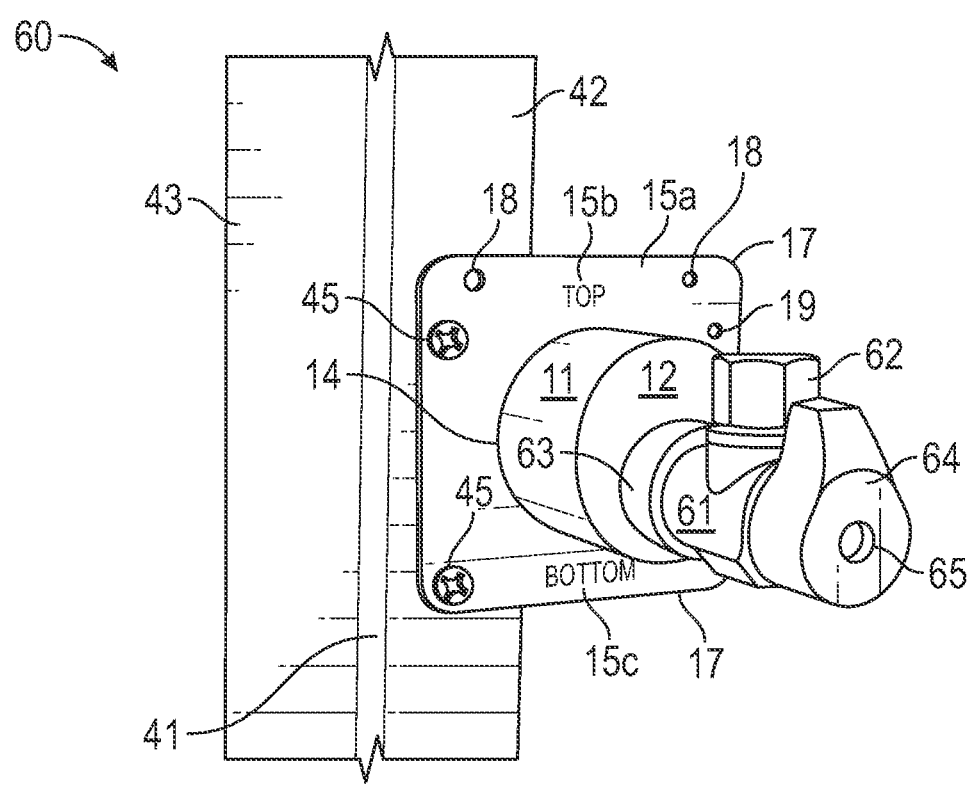
FIG. 19 illustrates an isometric view of the unitary stub-out and rough-in plumbing valve cylinder having an internal conduit disposed therein, and the integral stub out mounting plate mounted to a vertical wall stud with a quarter-turn water stop valve with an inlet end having an internal compression fitting that is releasably coupled to a portion of a water line that is received in the internal conduit, and extending a selective distance externally of the unitary stub-out and rough-in plumbing valve cylinder according to the present invention.

FIG. 19 is an isometric view of the new and improved molded one-piece or unitary stub out and rough-in plumbing valve cylinder assembly 60, wherein the integral stub out mounting plate 15 is attached to the front face 42 of a vertical wall framed stud member 40 by a plurality screws or nails inserted in mounting holes 19 disposed along a peripheral side edge of the integral stub out mounting plate 15. Note that the plumber or user have cut or removed the capped end of the plastic type pipe 48 so that a water stop valve device, such as, a quarter-turn valve can be attached thereto. During the rough-in phase the plumber or user attaches the quarter-turn valve having a valve body housing 61, a valve handle or actuator 64 connected to a valve stem (not shown) by a screw member 65, an inlet valve body portion 63 with an inner compression fitting, and a valve outlet 54 thereto. Note that the inlet body portion 63 with an internal compression fitting that secures and seals the valve body housing 61 to the plastic type pipe 48 at the inlet valve body portion 63 with the internal compression fitting. The valve body portion 63 with the inner compression fitting is disposed externally and abuts the front face 12 about the integral front cavity 13 of the cylinder 11 for easy removal of the compression nut 53 for servicing and/or removal of the valve body housing 61. The outlet 62 is connectable to the inlet of water fixture type devices.

Figure 20:
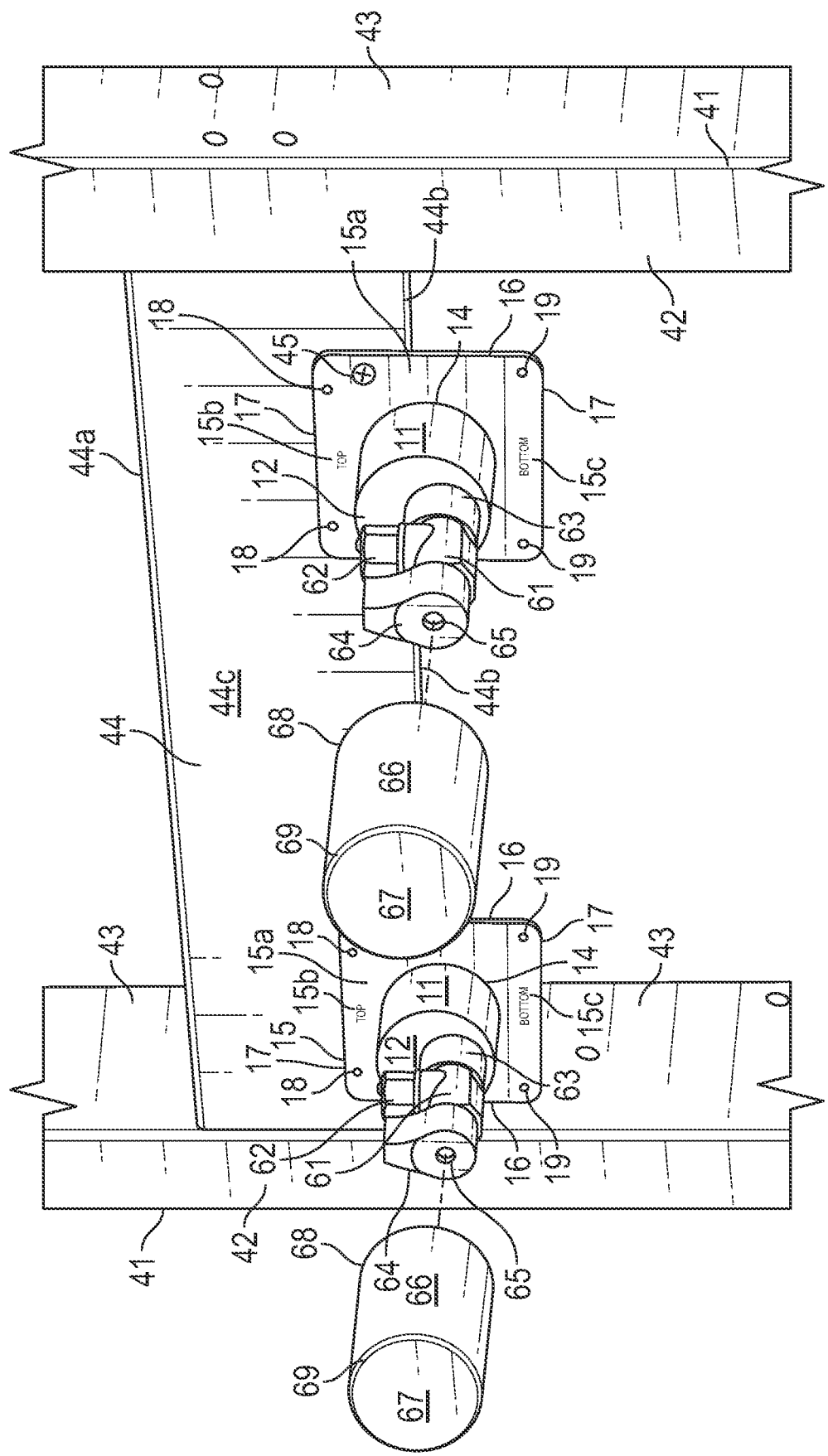
FIG. 20 illustrates an isometric view of a pair of the unitary stub-out and rough-in plumbing valve cylinder having an internal conduit disposed therein, and the integral stub out mounting plates mounted to a horizontal wall stud with a quarter-turn water stop valve with the inlet end having an internal compression fitting that is releasably coupled to a portion of a water line that is received in each one of the internal conduits, which extends a selective distance externally of the pair of the unitary stub-out and rough-in plumbing valve cylinders, and a pair of protective covers to be received over the quarter-turn stop valves, and the pair of the unitary stub-out and rough-in plumbing valve cylinders according to the present invention.

FIG. 20 is an isometric view that shows a pair of the new and improved molded one-piece or unitary stub out and rough-in plumbing valve cylinder assembly 60 with a water stop valve device, such as, a quarter-turn valve attached thereto. Note that the water stop valve device, such as, the quarter-turn valve discussed above for FIG. 19 is the same as in FIG. 20. First, a pair of the new and improved molded one-piece or unitary stub out and rough-in plumbing valve cylinder assembly 60 with a water stop valve device, such as, the quarter-turn valve 61 is attached directly attached to the front face 44c of a horizontal wall framed stud member by a plumber or user. Second, a protective cylindrical cover 66 having a cap or enclosure 67 with an integral attaching portion 69 or it could be a securing means 69 to allow attachment and removal of the cap 67, and an end portion 68 is shown. The protective cover 66 has an internal diameter that is slightly larger than the outer diameter of the cylinder 11 of the new and improved molded one-piece or unitary stub out and rough-in plumbing valve cylinder assembly 60. During the rough-in phase, the plumber or user will slide the protective cover 66 over the quarter-turn valve 61 and along the cylinder 11 until it abuts the integral stub out mounting plate 15 to protect the quarter-turn valve 61 and the cylinder 11 during drywall, plaster, or stucco installation, painting, and any damage thereto. Note that details of the quarter-turn valve 61, the horizontal wall framed stud assembly 40 and the valve cylinder 11 and the integral stub out mounting plate 15 have been discussed above in FIGS. 10-11, and FIG. 19.

Figure 21:
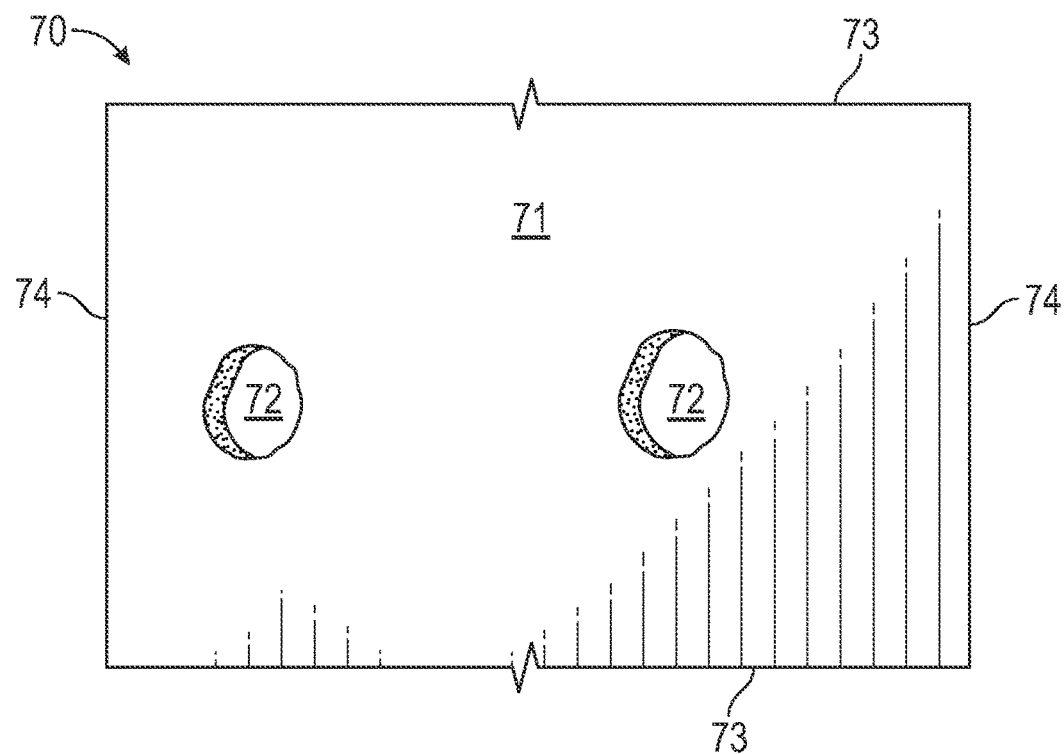
FIG. 21 illustrates a perspective view of a drywall structure or the like with a plurality of spaced apart cut-out holes therein according to the present invention.

FIG. 21 show a perspective front view of a wall material structure 70, such as, drywall, plasterboard, wallboard, and/or sheetrock that a carpenter or wall installer will cut a selective size diameter hole within the wall material 71 that is slightly larger than the diameter of the outer diameter of the protective cover 66. The wall material 71 includes top and bottom end portions 73, and side end portions 74. A pair of spaced apart selective size diameter holes 72 are disposed through the wall material 71.

Figure 22:
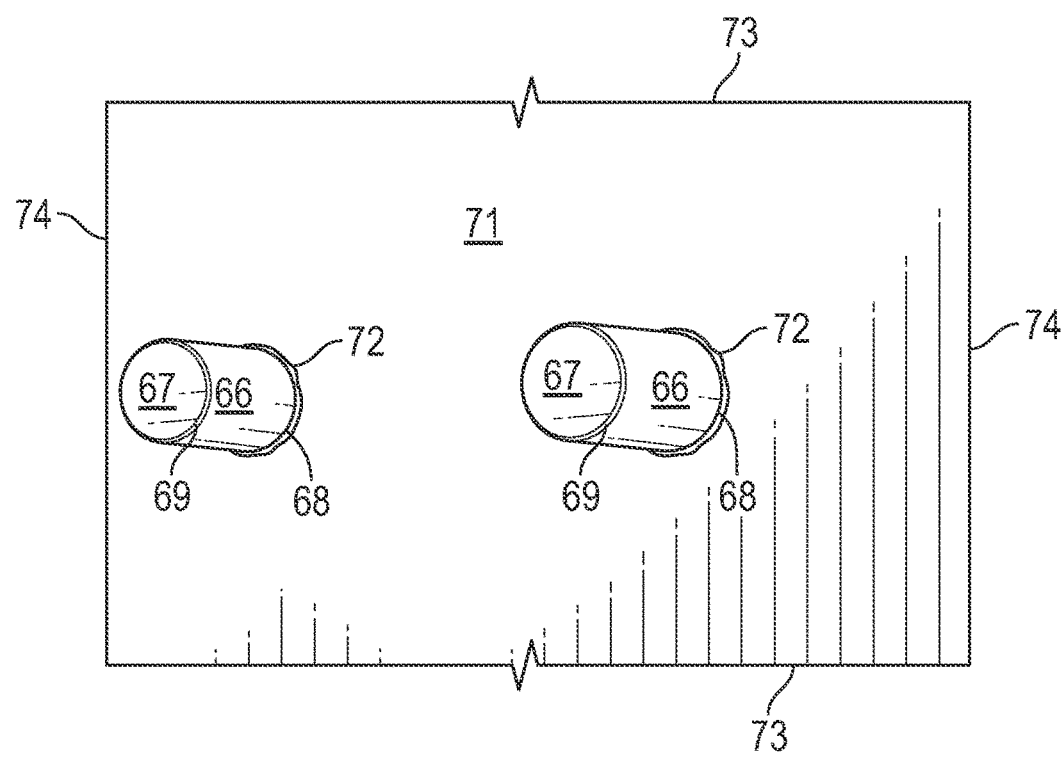
FIG. 22 illustrates a perspective view of the drywall structure or the like of FIG. 21 that is slidably received over the quarter-turn water stop valves, and the pair of the unitary stub-out and rough-in plumbing valve cylinders as described in FIG. 20 via the plurality of spaced apart cut-out holes as shown in FIG. 21 according to the present invention.

FIG. 22 shows a perspective of the wall material 71 that has been installed by the carpenter or wall installer over the protective cover of each one of the pair of the new and improved molded one-piece or unitary stub out and rough-in plumbing valve cylinder assembly 60 with a water stop valve device, such as, a quarter-turn valve 61 attached thereto as shown in FIG. 20 with the end portion 68 of the protective cover 66 being at least contiguous to or at the hole 72. Moreover, the wall material 71 has been secured to the horizontal wall framed stud member 44. Details of the wall material 71 will not be discussed for FIG. 22 since it is the same as discussed in FIG. 21.

Figure 23:
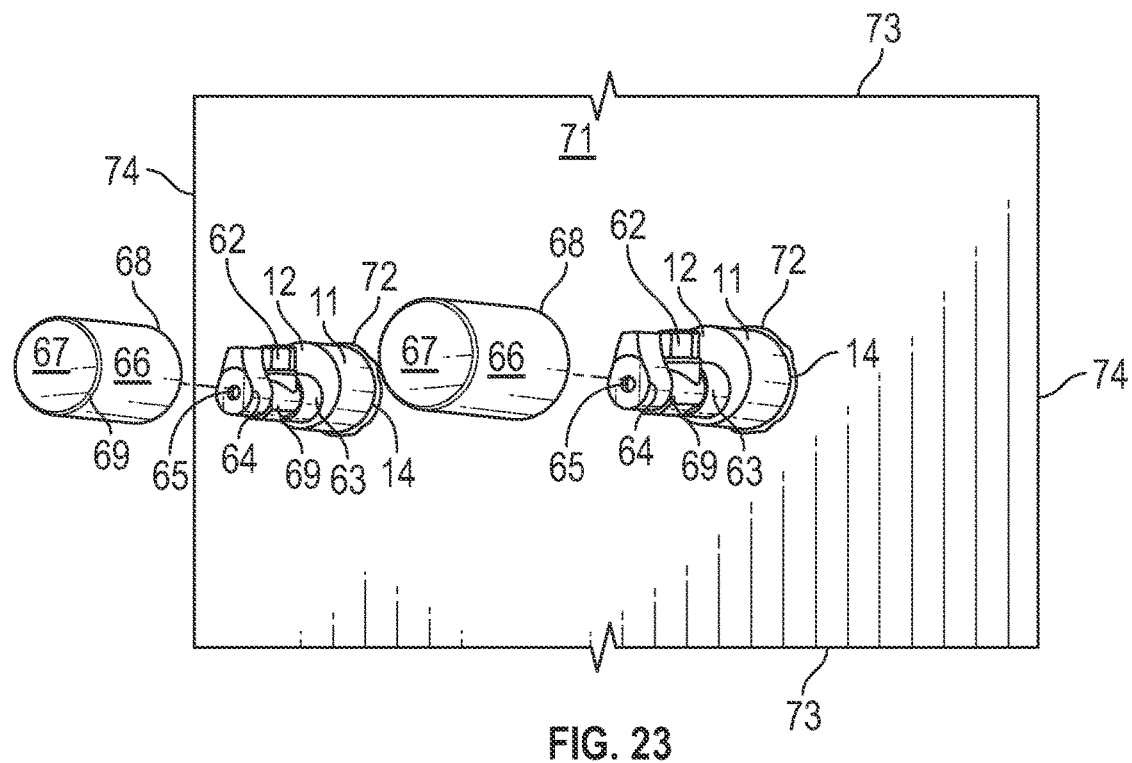
FIG. 23 illustrates a perspective view of the pair of protective covers being removed away from the drywall structure or the like as shown in FIG. 22 and from over the pair of the unitary stub-out and rough-in plumbing valve cylinders, and the quarter-turn water stop valves as described in FIG. 20 according to the present invention.

FIG. 23 shows a perspective view of FIG. 22 where a plumber or user is removing the protective cover 66 away from the wall material 71 and from over the pair of the new and improved molded one-piece or unitary stub out and rough-in plumbing valve cylinder assembly 60 with the water stop valve device, such as, quarter-turn valve 61 during the trim out phase.

Figure 24:
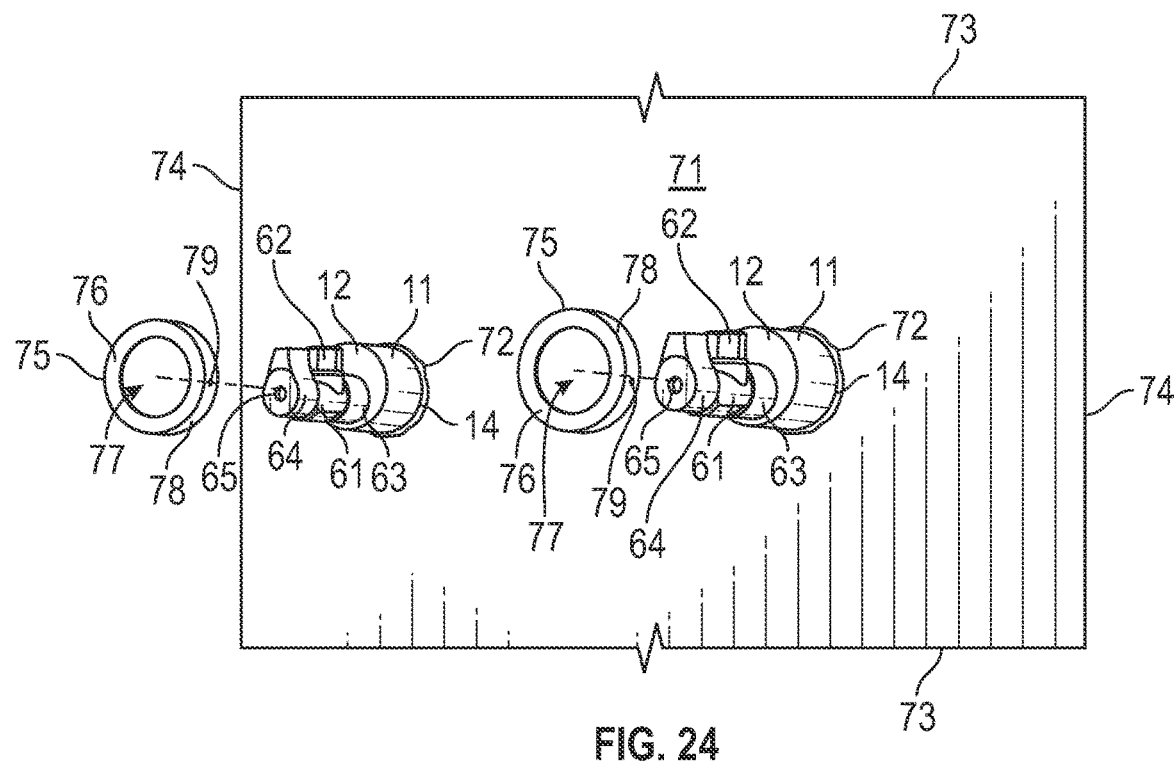
FIG. 24 illustrates a perspective view of the attached drywall structure or the like of FIG. 21 that is permanently secured and received over the quarter-turn water stop valves, and the pair of the unitary stub-out and rough-in plumbing valve cylinders with the removed covers as described in FIG. 23 so that a pair of trim rings can be received over the quarter-turn water stop valves, and the pair of the unitary stub-out and rough-in plumbing valve cylinders to close off any space that that might exist between the plurality of spaced apart cut-out holes in the attached drywall structure or the like and the pair of the unitary stub-out and rough-in plumbing valve cylinders according to the present invention.

FIG. 24 shows a perspective view of FIG. 23 where a plumber or user, after the removal of the protective cover 66, a trim ring 75 will be inserted over the pair of the new and improved molded one-piece or unitary stub out and rough-in plumbing valve cylinder assembly 60 with the water stop valve device, such as, quarter-turn valve 61 to close off the gap or space as shown between the hole 72 in the wall material 71 and the integral end 14 of the cylinder 11 that is integrally attached to the integral stub out mounting plate 15. Note that the trim 75 has a selective size diameter hole that is freely and tightly received over the pair of the new and improved molded one-piece or unitary stub out and rough-in plumbing valve cylinder assembly 60 with the water stop valve device, such as, quarter-turn valve 61.

FIG. 25 shows a perspective view of FIG. 24 where the trim ring 75 has been fully inserted over the pair of the new and improved molded one-piece or unitary stub out and rough-in plumbing valve cylinder assembly 60 with the water stop valve device, such as, quarter-turn valve 61. The trim 75 rests securely against the wall material 71 and closing the gap or space between the hole 72 in the wall material 71 and the integral end 14 of the cylinder 11 that is integrally attached to the integral stub out mounting plate 15 as shown in FIGS. 23 and 24. A set screw 83 can be inserted in hole 79 to tightly secure the trim ring, if necessary. Details of the trim ring 75 will be discussed below in FIGS. 26 and 27.

FIG. 26 shows an isometric rear view of the trim ring 75 that includes a central opening 77, an outer annular ring portion 78, a set screw hole 79, an inner annular rear face portion 80, an inner annular ring portion 81, and an annular rear ring edge portion 82. The isometric view as shown in FIG. 27 includes the same reference numerals as indicated in FIG. 26, except for outer annular front face portion 76.

While the foregoing written description of the invention enables one of ordinary skill in the art to make and use what is considered presently to be the best mode thereof, those of ordinary skill will understand and appreciate the existence of variations, combinations, and equivalents of the specific embodiment, method, and examples herein. The invention should therefore not be limited by the above described embodiments, and examples, but by all embodiments and methods within the scope and spirit of the invention as claimed.

What is claimed is:

1. A new and improved valve plumbing assembly comprising:
    a unitary stub out and rough-in plumbing valve cylinder including a front cylindrical face having an inner off-set cavity of a certain depth disposed therein, which extends to an inner cylindrical wall member that forms an integral conduit member that extends therefrom;
    an integral inner rear cylindrical cavity extending from an inner cylindrical rear wall surface on an opposite side of the front cylindrical face to an open ended integral mounting plate member;

the integral conduit member further extends through the integral cylindrical rear cavity to a selective distance beyond the open end of the integral mounting plate member;

the integral conduit member having a plurality of support members disposed integrally thereon, and integrally attached within and along the integral cylindrical rear cavity for rigidly supporting stub out water lines against movement and flexing therein; and wherein, the integral conduit further includes a top flat portion with a plurality of flange edge members disposed at opposite side ends, and extending at least along the selective distance that extends beyond the open end of the integral mounting plate member for self-leveling the unitary stub out and rough-in plumbing valve cylinder when the mounting plate is attached directly to vertical and horizontal wall framed stud members.

2. The new and improved valve plumbing assembly according to claim 1, wherein the integral conduit member is disposed through a first cylindrical diameter section and a second diameter section, the first cylindrical diameter section is defined by the inner cylindrical wall member of the inner off-set cavity that extends therefrom and into the integral cylindrical rear cavity, which extends through the inner rear wall surface disposed on the opposite side of the front cylindrical face to a selected distance therein, and terminating into an inner rear cylindrical face.

3. The new and improved valve plumbing assembly according to claim 2, wherein the second diameter section is integrally attached to the inner rear cylindrical face of the first cylindrical diameter section, which extends slightly inward of the outer circumference of the first cylindrical diameter section, and extending through the integral cylindrical rear cavity to a selective distance beyond the open end of the integral mounting plate member, the second diameter section comprises the top flat portion that extends from the inner rear cylindrical face of the first cylindrical diameter section to the selective distance beyond the open end of the mounting plate member, the flange edge members are disposed at the opposite side ends of the top flat portion includes a flat side portion formed on opposite sides of the second diameter section, each of the flat side portions having an upper end integrally connected to each of the flange edge members disposed at the opposite side ends of the flat side portions, and a lower end connected to an integrally formed bottom semi-circular portion of the integral cylindrical rear cavity.

4. The new and improved valve plumbing assembly according to claim 3, wherein the plurality of support members comprises a first elongated side edge, a second elongated side edge, a first front edge, and a second rear edge, the first elongated side edge and the second elongated side edge are integrally joined together at a front end by the first front edge and at a rear end by the second rear edge that form unitary support members on opposite sides of the first cylindrical diameter section and the integrally attached second diameter section of the integral conduit member, the first elongated side edge of the plurality of support members are integrally attached along the first cylindrical diameter section and the second diameter section on opposite sides thereof, and along a portion of the inner rear cylindrical face of the first cylindrical diameter section at a junction of the first cylindrical diameter section and the second diameter section on opposite sides thereof, each of the second elongated side edge of the plurality of support members are spaced from each of the first elongated side edge of the pair of the plurality of support members, which are integrally attached along the inner cylindrical rear cavity wall surface on opposite sides of the first cylindrical diameter section by the first front edge, and extending integrally therefrom and along the inner cylindrical rear side wall of the inner cylindrical rear cavity and joined at the open end of the integral mounting plate member contiguous to the second rear edge at one side end thereof and the opposite side end thereof being integrally attached to each of the first elongated side edges that is integrally joined to each of the flat side portions of the second diameter section of the integral conduit member on opposite sides thereof at the open end of the integral mounting plate member.

5. The new and improved valve plumbing assembly according to claim 4, wherein the plurality of support members includes an additional support member that comprises top and bottom elongated edges, a front vertical edge and a rear vertical edge, the bottom elongated edge is integrally joined by the front vertical edge to a bottom central portion of the inner rear cylindrical face of the first cylindrical diameter section, and the bottom elongated edge is integrally joined to and along the bottom central portion of the inner cylindrical rear cavity by the rear vertical edge to the bottom central portion of the inner cylindrical rear cavity at the open end of the integral mounting plate member, the top elongated edge is integrally attached to the bottom central portion of the inner rear cylindrical face of the first cylindrical diameter section by the front vertical edge, and extends along a bottom surface of the semi-circular portion of the second diameter section and terminating at the open end of the integral mounting plate member, while simultaneously spacing the second diameter section above the bottom wall of the inner cylindrical rear cavity, and the plurality of support members further includes a bottom portion of the first cylindrical diameter section that is integrally molded to and supported on the bottom wall of the inner cylindrical rear cavity extending from a bottom portion of the inner cylindrical rear cavity wall surface to the inner rear cylindrical face of the first cylindrical diameter section.

6. The new and improved valve plumbing assembly according to claim 4, wherein a bevel surface is disposed between the flange edge members at opposite side ends of the top flat portion and at the upper end of the flat side portions on opposite sides of the second diameter section of the integral conduit member, and each of the flat side portions forms a unitary leveling device for self-leveling the molded one-piece or unitary stub out and rough-in plumbing valve cylinder when the integral mounting plate member is ready to be selectively attached directly to vertical and horizontal wall framed stud members, a first self-leveling feature is achieved by placing one of the flat side portions that extend a selective distance beyond the open end of the integral mounting plate member directly against a side face of a vertical wall framed stud member and securing the integral mounting plate member thereto via mounting holes disposed therein, upon the integral mounting plate member being positioned along the bevel surface relative to the side face of the vertical wall framed stud member, the integral mounting plate member is not level and is tilted relative to the side face of the vertical wall framed stud member, a second self-leveling feature is defined by the top flat portion that extends a selective distance beyond the open end of the mounting plate member, and the second self-leveling feature is achieved by positioning the top flat portion directly underneath a bottom face of the horizontal wall framed stud member and securing the integral mounting plate member thereto via mounting holes disposed therein.

7. The new and improved valve plumbing assembly according to claim 6, wherein the mounting holes disposed within the mounting plate member includes a plurality of mounting holes extending through a front surface and through the rear surface of the mounting plate member, the mounting holes comprises a pair of selectively spaced apart mounting holes disposed along and contiguous to opposite peripheral vertical sides of the mounting plate member, and a pair of selectively spaced apart mounting holes disposed contiguous to a top peripheral horizontal side of the mounting plate member, each one of the pair of selectively spaced apart mounting holes that are disposed contiguous to the opposite peripheral vertical sides of the selectively spaced apart mounting holes is disposed near the top horizontal side of the mounting plate member, and is positioned below the pair of selectively spaced apart mounting holes that are disposed contiguous to the top peripheral horizontal side of the mounting plate member, the other one of the pair of selectively spaced apart mounting holes that are disposed contiguous to the opposite peripheral vertical sides are disposed along and contiguous to a bottom horizontal side of the mounting plate member, wherein at least a pair of securing members selected from the group consisting of nails and screws are inserted within the plurality of selectively spaced apart mounting holes disposed along at least one of the opposite peripheral vertical sides of the mounting plate member for securing the mounting plate member to the vertical wall framed stud member, and inserted within at least a pair of the plurality of selectively spaced apart mounting holes disposed along the top peripheral horizontal side of the mounting plate member for securing the mounting plate member to the horizontal wall framed stud member.

8. The new and improved valve plumbing assembly according to claim 7, wherein a copper stub out water line having a blocked end, and an opposite end having an open 90 degree bend with the blocked end initially passing through the integral conduit member at the open end of the integral mounting plate member and out through the off-center hole disposed within the front inner off-set cavity of the unitary stub out and rough-in plumbing valve cylinder, and extending to a selective distance there from, then a portion of the blocked end of the copper stub out water line is cut off so that a water stop valve device, such as, a quarter-turn valve member is attached to a compression inlet end of a base end portion thereof by a compression nut fitting that forms a single stub out valve unit, upon a tight securement of the copper stub out water line and the compression nut, the compression nut will rest against the front cylindrical face of the unitary stub out and rough-in plumbing valve cylinder and disposed externally about the front inner off-set cavity thereof for easy access and removal of the water stop valve from the copper stub out water line, a protective cover member is designed to slide tightly and easily over the entire single stub out valve unit to prevent any damage thereto, a wall member having at least a selective cut hole therein, which allows the wall member to slide tightly and easily over and along the protective cover until it rests against and covers the vertical and horizontal wall framed stud members, and the integral mounting plate members so that the wall member can be secured to the vertical and horizontal wall framed stud members, wherein the protective cover member is easily removed from the entire single stub out valve unit by sliding there along and away from the wall member, a trim ring having a selective size central opening therein that allows it to slide easily and tightly across the entire single stub out valve unit until it rests against the wall member for covering any imperfections in the at least a selective cut hole in the wall member, and the trim ring includes at least a pair of set screw holes to receives at least a pair of set screws therein to secure it relative to the single stub out valve unit, only if the trim ring is not tightly secured about the single stub out valve unit.

9. The new and improved valve plumbing assembly according to claim 7, wherein a plastic type stub out water line having a capped end, and an opposite straight end for receiving a having an L-shaped quick-disconnect fitting with the straight end initially passing through the integral conduit member through the off-center hole disposed within the front inner off-set cavity and out through the open end of the integral mounting plate member of the unitary stub out and rough-in plumbing valve cylinder, and extending to a selective distance there from, then a portion of the capped end of the plastic type stub out water line is cut off so that a water stop valve device, such as, a quarter-turn valve member is attached thereto by a push-to-connect fitting disposed within a compression inlet end of a base end portion of the quarter-turn valve member that forms a single stub out valve unit, upon a tight securement of the plastic type stub out water line within the base end portion by the push-to-connect fitting therein, the base end portion will rest against the front cylindrical face of the unitary stub out and rough-in plumbing valve cylinder and disposed externally about the front inner off-set cavity thereof for easy access and removal of the water stop valve from the plastic type stub out water line, a protective cover member is designed to slide tightly and easily over the entire single stub out valve unit to prevent any damage thereto, a wall member having at least a selective cut hole therein, which allows the wall member to slide tightly and easily over and along the protective cover until it rests against and covers the vertical and horizontal wall framed stud members, and the integral mounting plate members so that the wall member can be secured to the vertical and horizontal wall framed stud members, wherein the protective cover member is easily removed from the entire single stub out valve unit by sliding there along and away from the wall member, a trim ring having a selective size central opening therein that allows it to slide easily and tightly across the entire single stub out valve unit until it rests against the wall member for covering any imperfections in the at least a selective cut hole in the wall member, and the trim ring includes at least a pair of set screw holes to receives at least a pair of set screws therein to secure it relative to the single stub out valve unit, only if the trim ring is not tightly secured about the single stub out valve unit.

10. A unitary stub out and rough-in plumbing cylindrical valve device attached to a wall framed stud assembly comprising:
a cylindrical valve member having a front cylindrical face, an off-set cavity of a selective diameter is disposed through the front cylindrical face, and extending to a selective depth within the cylindrical valve member ending at an inner wall member defining an off-set opening therein;
the cylindrical valve member including an integral stub out mounting plate that is integrally attached to a rear portion of the cylindrical valve member with an open end;
an inner rear cylindrical cavity integrally attached to an inner cylindrical rear wall surface that is disposed on an opposite side of the front cylindrical face of the cylindrical valve member, the inner rear cylindrical cavity extends from the inner cylindrical rear wall surface to the open end of the integral stub out mounting plate;

a first cylindrical diameter section having a front end that is integrally attached to the inner cylindrical rear wall surface, and an inner rear cylindrical face disposed at the other end of the first cylindrical diameter section, a second diameter section having a front end that is integrally attached to the inner rear cylindrical face inward of the outer circumference of the first cylindrical diameter section and extending a selective distance beyond the open end of the stub out integral mounting plate to a rear end face thereof;

an integral conduit is formed through the first cylindrical diameter section and the second diameter section from the inner wall member off-set opening to the rear end face of the second diameter section for receiving stub out water lines there through; and a top flat portion of the second diameter section extending at least from the front end of the second diameter section to the rear end face of the second diameter section forms a first leveling device when the integral stub out mounting plate of the unitary stub out and rough-in plumbing valve cylinder is attached directly to wall framed stud members.

11. The unitary stub out and rough-in plumbing cylindrical valve device attached to the wall framed stud assembly according to claim 10, wherein the first cylindrical diameter section and the second diameter section includes a plurality of support members integrally attached there along to support the first cylindrical diameter section and the second diameter section within the inner rear cylindrical cavity.

12. The unitary stub out and rough-in plumbing cylindrical valve device attached to the wall framed stud assembly according to claim 11, wherein a pair of the plurality of support members including a first inner elongated side edge and a second outer elongated side, the first inner elongated side edge and the second outer elongated side edge are integrally joined together at a front end by a first front edge and at a rear end by a second rear edge that form unitary support members on opposite sides of the first cylindrical diameter section and the integrally attached second diameter section, the first inner elongated side edge extends continuous from the inner cylindrical rear wall surface along the first cylindrical diameter section, along the inner rear cylindrical face inward of the outer circumference of the first cylindrical diameter section, and continuing along the second diameter section on opposite sides thereof to a rear end face thereon, and ending at the open end of the stub out integral mounting plate, and the second outer elongated side extends continuous from the inner cylindrical rear wall surface along the inner rear cylindrical cavity to a rear end face thereon, ending at the open end of the stub out integral mounting plate.

13. The unitary stub out and rough-in plumbing cylindrical valve device attached to the wall framed stud assembly according to claim 12, wherein the plurality of support members further includes an additional support member comprising a top elongated edge, a bottom elongated edge, a front vertical edge, and a rear vertical edge, a front end of the top elongated edge, and the bottom elongated edge are integrally joined by the front vertical edge to a bottom central portion of the inner rear cylindrical face of the first cylindrical diameter section, and a rear end of the top elongated edge and the bottom elongated edge are integrally joined by the rear vertical edge at a bottom central portion of the inner rear cylindrical cavity at the open end of the integral stub out wall mounting plate, the top elongated edge extends from a bottom central portion of the inner rear cylindrical face of the first cylindrical diameter section, and extends along a bottom surface of the second diameter section and ending at the open end of the integral stub out wall mounting plate, while simultaneously spacing the second diameter section above the inner cylindrical rear cavity at the bottom thereof, and a bottom portion of the first cylindrical diameter section is integrally attached to and supported on the inner cylindrical rear cavity at the bottom thereof, and extending from a bottom portion of the inner cylindrical rear cavity wall surface to a bottom portion of the inner rear cylindrical face of the first cylindrical diameter section.

14. The unitary stub out and rough-in plumbing cylindrical valve device attached to the wall framed stud assembly according to claim 10, wherein the top flat portion of the second diameter section having a pair of flange edge members at opposite sides of the top flat portion defining a bevel surface disposed between the pair of flange edge members, a pair of flat side portions are disposed on opposite sides of the second diameter section forming a second leveling device, each one of the flat side portions having an upper end integrally connected to the pair of flange edge members, and a lower end connected to an integrally formed bottom semi-circular portion of the second diameter section, wherein the top flat portion of the first leveling device can be placed underneath a bottom end surface of a horizontal wall framed stud member for leveling the unitary stub out and rough-in plumbing cylindrical valve device when the integral stub out mounting plate is directly attached to a front surface of the horizontal wall framed stud member, and the flat side portions of the second leveling device can be placed against the inner side face of a vertical wall framed stud member for leveling the unitary stub out and rough-in plumbing cylindrical valve device when the integral stub out mounting plate is directly attached to a front end face of the vertical wall framed stud member.

15. The unitary stub out and rough-in plumbing cylindrical valve device attached to the wall framed stud assembly according to claim 10, wherein the top flat portion defining a first self-leveling feature includes a pair of inner edge members that extends integrally from the inner cylindrical rear cavity wall surface of the integral rear cylindrical cavity continuously along opposite sides of the first cylindrical diameter section near a top portion thereof, across the inner rear cylindrical face with the entire top flat portion extending outward to a pair of outer flange edge members at opposite ends thereof that is integrally attached along the inner cylindrical rear cavity, and extending to a selective distance beyond the open end of the integral stub out mounting plate, the pair of outer flange edge members at opposite ends of the top flat portion is integrally connected to a top end of a pair of downward extending flat side leg portions on opposite sides of the first cylindrical diameter section and the second diameter section and spaced there from, a rear end face of the top flat portion is integrally attached to the pair of downward extending flat rear leg portions, and an outward extended edge face is disposed and spaced inward from the rear end face is integrally attached to the rear end face of the stub out wall mounting plate defining a second self-leveling feature forming an inverted U shape, wherein the top flat portion of the first leveling device can be placed underneath a bottom end surface of a horizontal wall framed stud member for leveling the unitary stub out and rough-in plumbing cylindrical valve device when the integral stub out mounting plate is directly attached to a front surface of the horizontal wall framed stud member, and the downward extending flat rear leg portions of the second leveling device can be placed against the inner side face of a vertical wall framed stud member for leveling the unitary stub out and rough-in plumbing cylindrical valve device when the integral stub out mounting plate is directly attached to a front end face of the vertical wall framed stud member.

16. The unitary stub out and rough-in plumbing cylindrical valve device attached to the wall framed stud assembly according to claim 11, wherein the second diameter section has a cylindrical configuration, a pair of the plurality of support members including a first inner elongated side edge and a second outer elongated side, the first inner elongated side edge and the second outer elongated side edge are integrally joined together at a front end by a first front edge and at a rear end by a second rear edge that form unitary support members on opposite sides of the first cylindrical diameter section and the integrally attached second diameter section, the first inner elongated side edge extends continuous from the inner cylindrical rear wall surface along the first cylindrical diameter section, along the inner rear cylindrical face inward of the outer circumference of the first cylindrical diameter section, and continuing along the second cylindrical diameter section on opposite sides thereof to a rear end face thereon, and ending at the open end of the stub out integral mounting plate, and the second outer elongated side extends continuous from the inner cylindrical rear wall surface along an inner flat surface of the downward extending flat side leg portions to the second rear edge thereon, ending at the open end of the stub out integral mounting plate, wherein the plurality of support members further includes an additional support member comprising a top elongated edge, a bottom elongated edge, a front vertical edge, and a rear vertical edge, a front end of the top elongated edge, and the bottom elongated edge are integrally joined by the front vertical edge to a bottom central portion of the inner rear cylindrical face of the first cylindrical diameter section, and a rear end of the top elongated edge and the bottom elongated edge are integrally joined by the rear vertical edge at a bottom central portion of the inner cylindrical rear cavity at the open end of the integral stub out wall mounting plate, the top elongated edge extends from a bottom central portion of the inner rear cylindrical face of the first cylindrical diameter section, and extends along a bottom surface of the second cylindrical diameter section and ending at the open end of the integral stub out wall mounting plate, while simultaneously spacing the second cylindrical diameter section above the inner cylindrical rear cavity at the bottom thereof, and a bottom portion of the first cylindrical diameter section is integrally attached to and supported on the inner cylindrical rear cavity at the bottom thereof, and extending from a bottom portion of the inner cylindrical rear cavity wall surface to a bottom portion of the inner rear cylindrical face of the first cylindrical diameter section.

17. The unitary stub out and rough-in plumbing cylindrical valve device attached to the wall framed stud assembly according to claim 10, wherein the stub out mounting plate includes a plurality of mounting holes extending through a front surface and through a rear surface of the stub out mounting plate, the plurality of mounting holes comprises a pair of selectively spaced apart mounting holes disposed along and contiguous to opposite peripheral vertical sides of the stub out mounting plate, and a pair of selectively spaced apart mounting holes disposed contiguous to a top peripheral horizontal side of the stub out mounting plate, each one of the pair of selectively spaced apart mounting holes that are disposed contiguous to the opposite peripheral vertical sides of the selectively spaced apart mounting holes is disposed near the top horizontal side of the stub out mounting plate, and is positioned below the pair of selectively spaced apart mounting holes that are disposed contiguous to the top peripheral horizontal side of the stub out mounting plate, the other one of the pair of the selectively spaced apart mounting holes that is disposed contiguous to the opposite peripheral vertical sides that are disposed along and contiguous to a bottom horizontal side of the stub out mounting plate, wherein at least a pair of securing members selected from the group consisting of nails and screws are inserted within the plurality of selectively spaced apart mounting holes disposed along at least one of the opposite peripheral vertical sides of the stub out mounting plate for securing the stub out mounting plate to a vertical wall framed stud member, and inserted within at least a pair of the plurality of selectively spaced apart mounting holes disposed along the top peripheral horizontal side of the stub out mounting plate member for securing the stub out mounting plate to a horizontal wall framed stud member.

18. The unitary stub out and rough-in plumbing cylindrical valve device attached to the wall framed stud assembly according to claim 17, wherein a copper stub out water line having a blocked end, an opposite end having an open 90 degree bend with the blocked end initially passing through the integral conduit member at the open end of the integral stub out mounting plate and out through the inner wall member off-set opening disposed within the front inner off-set cavity of the unitary stub out and rough-in plumbing valve cylinder, and extending to a selective distance outward of the inner off-set cavity, then a portion of the blocked end of the copper stub out water line is cut off so that a water stop valve device, such as, a quarter-turn valve member is attached to a compression inlet end of a base end portion of the quarter-turn valve by a compression nut fitting that forms a unitary stub out valve unit, upon the compression nut securing and sealing the copper stub out water line within the base end of the quarter-turn valve, the compression nut will rest against the front cylindrical face of the unitary stub out and rough-in plumbing valve cylinder and disposed externally over the front inner off-set cavity to allow easy access and removal of the water stop valve from the copper stub out water line, a protective cover member is designed to slide tightly and easily over the entire unitary stub out valve unit to prevent any damage thereto, then a wall member having at least a selective cut hole therein, which allows the wall member to slide tightly and easily over and along the protective cover until it rests against and covers the vertical and horizontal wall framed stud members, and the integral stub out mounting plate so that the wall member can be secured to the vertical and horizontal wall framed stud members, wherein the protective cover member is easily removed completely from the unitary stub out valve unit by sliding there along and away from the wall member, a trim ring having a selective size central opening therein that allows it to slide easily and tightly across the unitary stub out valve unit until it rests against the wall member for covering any gap that exist between the unitary stub out valve unit and the at least a selective cut hole in the wall member, and the trim ring includes at least a pair of set screw holes to receives at least a pair of set screws therein to secure it relative to the unitary stub out valve unit, only if the trim ring is not tightly secured about the unitary stub out valve unit relative to the wall member.

19. The unitary stub out and rough-in plumbing cylindrical valve device attached to the wall framed stud assembly according to claim 17, wherein a plastic type stub out water line having a capped end, and an opposite straight end for receiving a having an L-shaped quick-disconnect fitting with the straight end initially passing through the integral conduit member through the inner wall member off-set opening disposed within the front inner off-set cavity and out through the open end of the integral stub out mounting plate of the unitary stub out and rough-in plumbing valve cylinder, and extending to a selective distance beyond the open end face of the integral conduit of the second diameter section, then a portion of the capped end of the plastic type stub out water line is cut off so that a water stop valve device, such as, a quarter-turn valve member is attached thereto by a push-to-connect type compression fitting disposed within a compression inlet end of a base end portion of the quarter-turn valve member that forms a unitary stub out valve unit, upon a tight securement of the plastic type stub out water line within the base end portion by the push-to-connect fitting therein, the base end portion will rest against the front cylindrical face of the unitary stub out and rough-in plumbing valve cylinder and disposed externally over the front inner off-set cavity to allow easy access and removal of the water stop valve from the plastic type stub out water line, a protective cover member is designed to slide tightly and easily over the entire unitary stub out valve unit to prevent any damage thereto, a wall member having at least a selective cut hole therein, which allows the wall member to slide tightly and easily over and along the protective cover until it rests against and covers the vertical and horizontal wall framed stud members, and the integral stub out mounting plate so that the wall member can be secured to the vertical and horizontal wall framed stud members, wherein the protective cover member is easily removed from the entire unitary stub out valve unit by sliding there along and away from the wall member, a trim ring having a selective size central opening therein that allows it to slide easily and tightly across the entire unitary stub out valve unit until it rests against the wall member for covering a gap that exists between the unitary stub out valve unit and the at least a selective cut hole in the wall member, and the trim ring includes at least a pair of set screw holes to receives at least a pair of set screws therein to secure it relative to the unitary stub out valve unit, only if the trim ring is not tightly secured about the unitary stub out valve unit relative to the wall member.

20. A new and improved cylindrical valve unit with an integral stub out mounting apparatus comprising:

a cylindrical member having a front cylindrical face, an off-set cavity of a selective diameter is disposed through the front cylindrical face, and extending to a selective depth within the cylindrical member ending at an inner wall member defining an off-set opening therein;

the cylindrical valve member including an integral stub out mounting plate having at least a pair of spaced apart mounting holes disposed along and near a top horizontal edge portion and at least a pair of spaced apart mounting holes disposed along and near opposite peripheral side edge portions, and integrally attached to a rear portion of the cylindrical valve member with an open end;

an inner rear cylindrical cavity integrally attached to an inner cylindrical rear wall surface that is disposed on an opposite side of the front cylindrical face of the cylindrical member, the inner rear cylindrical cavity extends from the inner cylindrical rear wall surface to the open end of the integral stub out mounting plate;

a first cylindrical diameter section having a front end that is integrally attached to the inner cylindrical rear wall surface, and an inner rear cylindrical face disposed at the other end of the first cylindrical diameter section, a second diameter section having a front end that is integrally attached to the inner rear cylindrical face inward of the outer circumference of the first cylindrical diameter section and extending a selective distance beyond the open end of the integral stub out mounting plate to a rear end face thereof;

an integral conduit is formed through the first cylindrical diameter section and the second diameter section from the inner wall member off-set opening to the rear end face of the second diameter section for receiving stub out water lines there through; and a top flat portion of the second diameter section extending at least from the front end of the second diameter section to the rear end face of the second diameter section forms a first self-leveling member and a downward extending flat portion extending from the top flat portion forming a second self-leveling member so that when the integral stub out mounting plate of the unitary stub out and rough-in plumbing valve cylinder is attached directly to horizontal and vertical wall framed stud members through a selective pair of the mounting holes of the integral stub out mounting plate, and one of the first and second self-leveling members will be selected for leveling the integral stub out mounting plate of the unitary stub out and rough-in plumbing valve cylinder when attached directly to the horizontal and vertical wall framed stud members, wherein the self-leveling member selection will depend upon which one of the horizontal and vertical wall framed stud members will be used for mounting the integral stub out mounting plate.

* * * * *